US011556096B2

(12) United States Patent
Takigawa

(10) Patent No.: US 11,556,096 B2
(45) Date of Patent: Jan. 17, 2023

(54) SUBMARINE BRANCHING UNIT AND SUBMARINE BRANCHING METHOD

(71) Applicant: NEC Corporation, Tokyo (JP)

(72) Inventor: Yoshinari Takigawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 235 days.

(21) Appl. No.: 16/637,540

(22) PCT Filed: Sep. 19, 2018

(86) PCT No.: PCT/JP2018/034551
§ 371 (c)(1),
(2) Date: Feb. 7, 2020

(87) PCT Pub. No.: WO2019/065385
PCT Pub. Date: Apr. 4, 2019

(65) Prior Publication Data
US 2020/0257251 A1 Aug. 13, 2020

(30) Foreign Application Priority Data

Sep. 29, 2017 (JP) .............................. JP2017-189336

(51) Int. Cl.
*G05B 9/02* (2006.01)
*H02G 9/02* (2006.01)
*H04B 10/80* (2013.01)

(52) U.S. Cl.
CPC ................ *G05B 9/02* (2013.01); *H02G 9/02* (2013.01); *H04B 10/807* (2013.01)

(58) Field of Classification Search
CPC .......... G05B 9/02; H02G 9/02; H04B 10/807; H04B 3/44; H04B 10/808; H02J 4/00
(Continued)

(56) References Cited

U.S. PATENT DOCUMENTS

2014/0103739 A1* 4/2014 Takigawa ................. H04B 3/44
307/112
2014/0308036 A1* 10/2014 Aida .................. H04Q 11/0005
398/45

FOREIGN PATENT DOCUMENTS

CN 102714547 A 10/2012
CN 103887954 A 6/2014
(Continued)

OTHER PUBLICATIONS

International Search Report dated Nov. 20, 2018, in the corresponding PCT International Application Form PCT/ISA/237(English version).

(Continued)

*Primary Examiner* — Hal Kaplan
*Assistant Examiner* — Swarna N Chowdhuri

(57) ABSTRACT

In order to enable switching control over power-feeding paths even in the event of a ground fault or an open fault in a power-feeding path, the submarine branching unit is provided with: a switching circuit which switches multiple power-feeding paths formed among a first through a third power-receiving ports; a control circuit which receives power from a power-feeding path formed between the first power-receiving port and the second power-receiving port and controls the switching circuit; and a connection circuit which connects the control circuit between the third power-receiving port and a sea-earth when no power is supplied to the control circuit from the power-feeding path formed between the first power-receiving port and the second power-receiving port.

15 Claims, 20 Drawing Sheets

(58) Field of Classification Search
USPC .................................................. 307/80, 112
See application file for complete search history.

(56) References Cited

FOREIGN PATENT DOCUMENTS

| | | | | |
|---|---|---|---|---|
| EP | 0917300 A3 | 1/2001 | | |
| JP | 3-76322 | 4/1991 | | |
| JP | 4-245816 | 9/1992 | | |
| JP | 9-181654 | 7/1997 | | |
| WO | WO 2013/002391 A1 | 1/2013 | | |
| WO | WO 2013/007017 A1 | 1/2013 | | |
| WO | WO-2013007017 A1 * | 1/2013 | ............... | H04B 3/44 |
| WO | WO-2016181642 A1 * | 11/2016 | ............... | H02H 3/00 |

OTHER PUBLICATIONS

Chinese Office Action for CN Application No. 201880061948.4 dated Mar. 2, 2021 with English Translation.

\* cited by examiner

US 11,556,096 B2

SUBMARINE BRANCHING UNIT AND SUBMARINE BRANCHING METHOD

CROSS-REFERENCE TO RELATED PATENT APPLICATIONS

This application is a National Stage Entry of International Application No. PCT/JP2018/034551, filed Sep. 19, 2018, which claims priority from Japanese Patent Application No. 2017-189336, filed Sep. 29, 2017. The entire contents of the above-referenced applications are expressly incorporated herein by reference.

TECHNICAL FIELD

The present invention relates to a submarine branching unit and a submarine branching method, and more particularly, to a submarine branching unit and a submarine branching method, being capable of switching a power feeding path when a fault occurs on the power feeding path.

BACKGROUND ART

In a submarine cable system, a network constituted of a plurality of submarine branching units (BUs) installed on a sea bottom and a plurality of land stations is configured for a purpose of handling meshing of the network and suppressing a construction cost. A submarine repeater and a submarine branching unit being used in such a submarine cable system generally operate by supply of electric power from a power feeding device installed at a land station.

FIG. 16 is a diagram illustrating a power feeding path of a general submarine cable system 900 using a BU. The submarine cable system 900 includes a BU 901 and a repeater 902. Power feeding devices 911 to 913 included in a land station are constant current supply devices, and electric power is supplied to the BU 901 and the repeater 902 by these constant current supply devices. The BU 901 includes a switching circuit 903.

FIGS. 17 to 19 are first to third diagrams illustrating a power feeding path of the BU 901. The BU 901 can change a configuration of the power feeding path according to a control instruction from any of the power feeding devices 911 to 913. The switching circuit 903 of the BU 901 receives the control instruction, and switches the power feeding path by operating a relay included in the switching circuit 903.

FIG. 17 illustrates a case where power is fed to the BU 901 from a power feeding path of a branch A and a branch B. For example, the power feeding device 911 connected to the branch A has positive polarity, and the power feeding device 912 connected to the branch B has negative polarity. In this case, a power feeding current flows in from the branch A, is fed to the BU 901, and flows out to the branch B. At this time, power is also fed to the repeaters 902 installed on the branch A and the branch B. Since power feeding is performed with a constant current, a current of the branch A and a current of the branch B are equal. A branch C is connected to the power feeding device 913. In FIG. 17, the branch C is not connected to the branch A and the branch B, and a power feeding current of the branch C is connected to a sea earth (SE) and is grounded.

FIG. 18 illustrates an example of a power feeding path after a ground fault occurs on the power feeding path at a place with an "X" mark of the branch A of the BU 901. The ground fault is a fault that an electric wire of a power feeding path is grounded under the sea. In other words, a ground fault place becomes a sea earth. At a point in time when the ground fault occurs, electric power is supplied to the BU 901 by forming a power feeding path of a path "sea earth—ground fault place—BU 901—branch B—power feeding device 912". Then, the switching circuit 903 switches a power feeding path inside the BU 901 as in FIG. 18, based on a control instruction received from any of the power feeding devices 911 to 913 that detect the fault. In other words, the switching circuit 903 connects the branch B to the branch C and reconstructs a power feeding path, and also connects the fault place of the branch A to the sea earth in the BU 901. Such connection achieves supply of electric power to the BU 901, and also disconnects the fault place from the switching circuit 903 and the power feeding path.

FIG. 19 illustrates an example of a power feeding path after a ground fault occurs on a power feeding path in the branch B of the BU 901. In this case, the switching circuit 903 connects the branch A to the branch C and reconstructs a power feeding path, and also connects a fault place of the branch B to the sea earth in the BU 901. When the ground fault occurs on only one of the power feeding paths, the BU 901 switches the power feeding path as in FIG. 18 or 19.

In relation to the present invention, PTLs 1 to 4 describe a switching circuit that switches a power feeding path.

CITATION LIST

Patent Literature

[PTL 1] Japanese Laid-Open Patent Application Publication No. H3-076322

[PTL 2] Japanese Laid-Open Patent Application Publication No. H4-245816

[PTL 3] Japanese Laid-Open Patent Application Publication No. H9-181654

[PTL 4] International Publication WO2013/002391

SUMMARY OF INVENTION

Technical Problem

FIGS. 20 and 21 are a first diagram and a second diagram illustrating an example of a fault that electric power is not supplied to the switching circuit 903. When electric power is not supplied to the switching circuit 903, the relay cannot be operated, and a power feeding path cannot be switched. For example, when a ground fault on power feeding paths occurs in both of the branch A and the branch B (FIG. 20), the BU 901 cannot form a power feeding path including the power feeding device 911 or 912 at the land station and the switching circuit 903. The same also applies to a case where an open fault that an electric wire of at least one of the power feeding paths is open occurs (FIG. 21). As a result, electric power is not supplied to the switching circuit 903 after the fault occurs, and switching control of a power feeding path cannot be performed.

OBJECT OF INVENTION

An object of the present invention is to provide a technique capable of performing switching control of a power feeding path even when a ground fault and an open fault on the power feeding path as described above occur.

Solution to Problem

A submarine branching unit of the present invention includes switching means for switching a plurality of power feeding paths formed between first to third power receiving ports, control means for receiving power feeding from a power feeding path formed between the first power receiving port and the second power receiving port, and controlling the switching means and connection means for connecting the control means between the third power receiving port and a sea earth when power is not fed to the control means from a power feeding path formed between the first power receiving port and the second power receiving port.

A submarine branching method of the present invention is a method for switching a plurality of power feeding paths formed between first to third power receiving ports. The submarine branching method includes causing control means to receive power feeding from a power feeding path formed between the first power receiving port and the second power receiving port, and controlling switching of the plurality of power feeding paths, and causing the control means to receive power feeding from a power feeding path formed between the third power receiving port and a sea earth when power is not fed to the control means from a power feeding path formed between the first power receiving port and the second power receiving port, and controlling switching the plurality of power feeding paths.

Advantageous Effects of Invention

The present invention provides a submarine branching unit and a submarine branching method, being capable of performing switching control of a power feeding path even when a ground fault and an open fault on the power feeding path occur.

EXAMPLE EMBODIMENT

Example embodiments according to the present invention will be described below. In drawings of the example embodiments, an arrow indicating a direction of a signal or a current represents an example for description, and does not limit the direction of the signal or the current. Further, a component that has already been described is provided with the same reference sign in each of the drawings, and the description thereof is omitted. In each of the example embodiments, a submarine branching method according to the present invention is used.

First Example Embodiment

Figure 1:
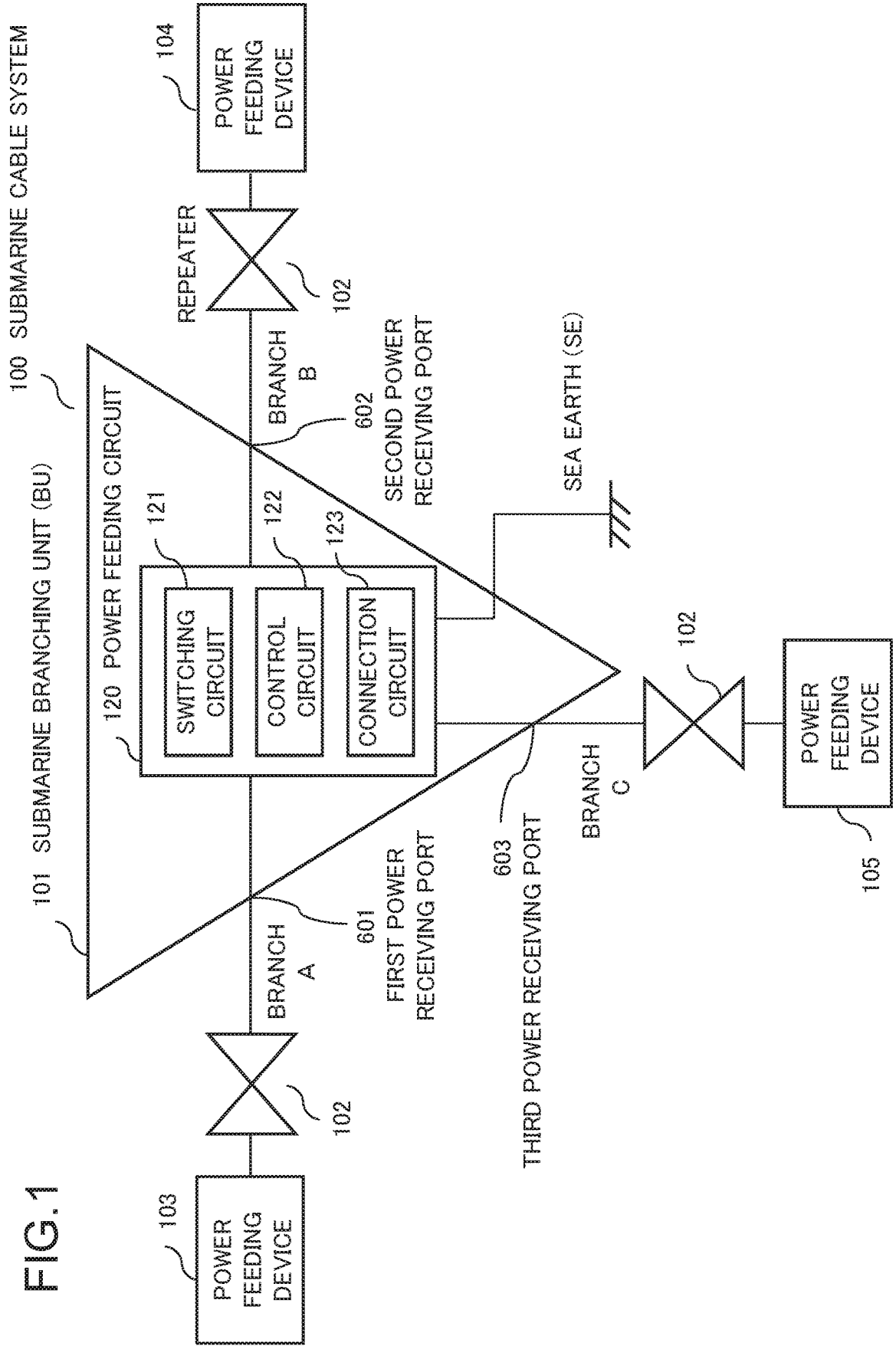
FIG. 1 is a diagram illustrating an example of a configuration of a submarine cable system 100 according to a first example embodiment.

FIG. 1 is a diagram illustrating an example of a configuration of a submarine cable system 100 according to a first example embodiment of the present invention. The submarine cable system 100 is a communication system that includes a submarine branching unit (BU) 101, a repeater 102, and power feeding devices 103 to 105. The BU 101 is a unit that is installed on a sea bottom and splits a submarine cable. The BU 101 includes first to third power receiving ports 601 to 603. Each of the power receiving ports is a conductive connection line, and is connected to a power feeding line of a submarine cable in three directions of a branch A, a branch B, and a branch C by brazing, crimping, and the like.

The branches A, B, and C are connected to the power feeding devices 103, 104, and 105, respectively. The repeater 102 relays an optical signal and an electric signal propagating through the submarine cable. The repeater 102 is installed only when necessary. The power feeding devices 103 to 105 are constant current supply devices provided at a land station, and supply electric power to the BU 101 and the repeater 102. The land station that houses the power feeding devices 103 to 105 is also referred to as a terminal station. The submarine cable is a cable including an optical fiber transmission path and a power feeding line. The power feeding line is an electric wire used for a power feeding path. Between the branches A to C, the BU 101 splits an optical signal or merges optical signals propagating through optical fiber cables, and also receives power feeding from at least one of the power feeding devices 103 to 105.

For example, the BU 101 splits an optical signal received by the branch A into the branch B and the branch C, based on setting of the submarine cable system 100. Thus, the BU 101 includes optical parts such as an optical switch for branching an optical signal and a wavelength selective switch (WSS), and a drive circuit of the optical parts. Then, the drive circuit of the optical parts also operates by power feeding from the power feeding devices 103 to 105, similarly to a control circuit 122. However, processing of branching and merging an optical signal in the BU 101 is a general technique except for processing of a control signal of a relay by an optical signal described later, and power feeding from a power feeding path to the drive circuit of the optical parts is also a general technique. Thus, switching of a power feeding path will be described in the description and the drawings of the example embodiments, and power feeding to the drive circuit of the optical parts and the processing of the optical signal will be omitted unless necessary.

The BU 101 includes a switching circuit 121, the control circuit 122, and a connection circuit 123. The switching circuit 121 is a circuit that switches a power feeding path inside the BU 101, and includes relays in the present example embodiment. In other words, the switching circuit 121 serves as a switching means for switching a plurality of power feeding paths formed between the first to third power receiving ports 601 to 603. A circuit that includes the switching circuit 121, the control circuit 122, and the connection circuit 123 is described as a power feeding circuit 120. Then, the BU 101 including such the power feeding circuit 120 can be referred to as the submarine branching unit.

The control circuit 122 controls the switching circuit 121. In other words, the control circuit 122 serves as a control means for controlling the switching circuit 121. When power feeding to the control circuit 122 stops due to a fault on a power feeding path, the connection circuit 123 feeds power to the control circuit 122 from another power feeding path. The power feeding circuit 120 includes a rectifier circuit. The rectifier circuit supplies a power feeding current with a certain polarity from the power feeding devices 103 to 105 to the control circuit 122 and the connection circuit 123. The rectifier circuit may be included in the control circuit 122 or the connection circuit 123. Details of these circuits will be described later.

Figure 2:
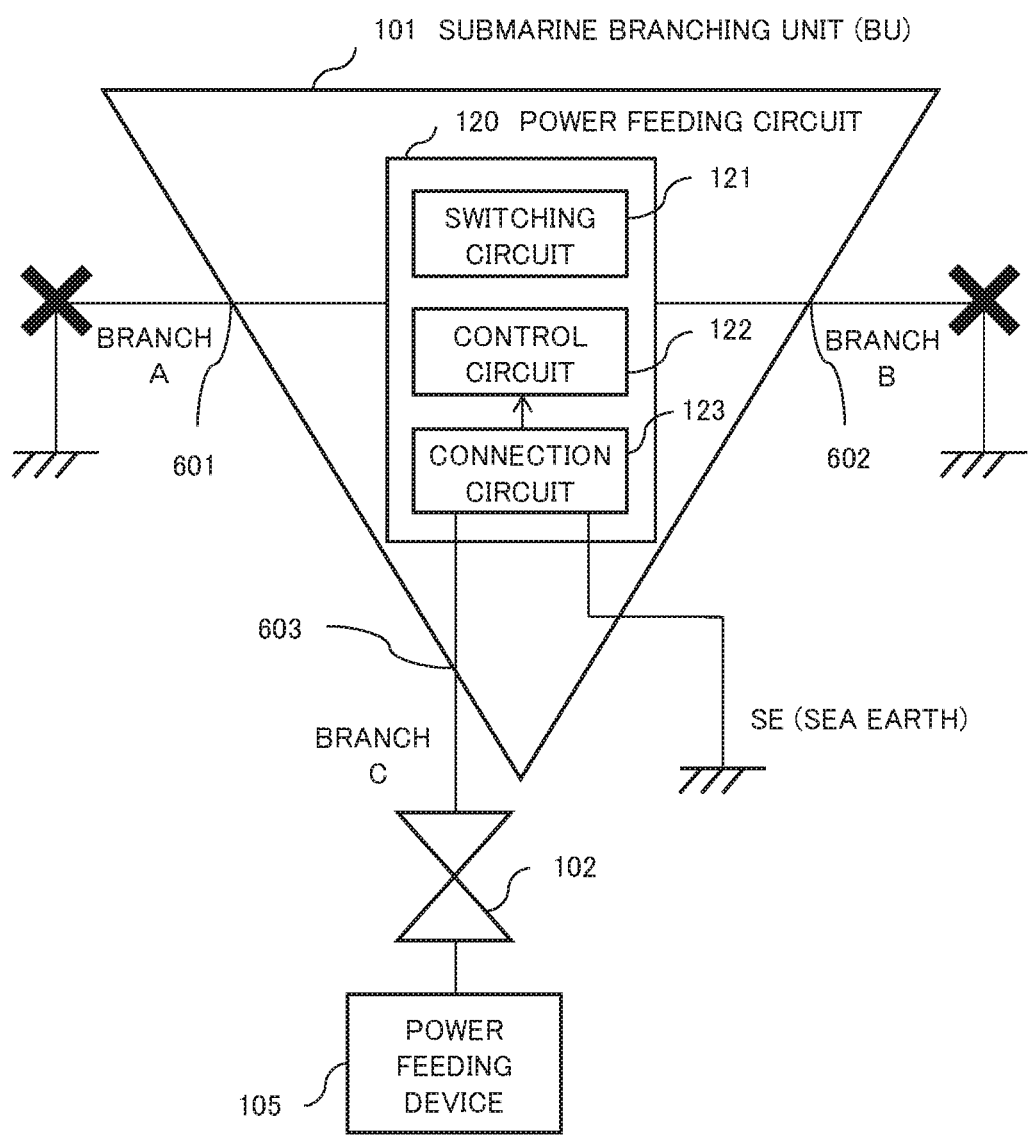
FIG. 2 is a diagram schematically illustrating a connection between a control circuit 122 and a connection circuit 123.

FIG. 2 is a diagram schematically illustrating a connection between the control circuit 122 and the connection circuit 123. When power feeding from a certain power feeding device to the control circuit 122 is lost, the connection circuit 123 is used for power feeding to the control circuit 122 by using a power feeding path connected to another power feeding device. In the present example embodiment, in a state where power is normally fed to the control circuit 122 by the power feeding devices 103 and 104 (that is, by using the branches A and B as power feeding paths), the connection circuit 123 is electrically disconnected from the control circuit 122. However, when power feeding to the control circuit 122 is lost due to a fault on a power feeding path, the connection circuit 123 forms a power feeding path in such a way that power is fed to the control circuit 122 by a power feeding path connected to a sea earth via the branch C and the connection circuit 123. Power feeding to the control circuit 122 via the connection circuit 123 enables switching of a power feeding path by controlling the switching circuit 121 by the control circuit 122 also after occurrence of a fault. In other words, the connection circuit 123 serves as a connection means for connecting the control circuit 122 between the third power receiving port 603 and the sea earth when power is not fed to the control circuit 122 from a power feeding path formed between the first power receiving port 601 and the second power receiving port 602.

Figure 3:
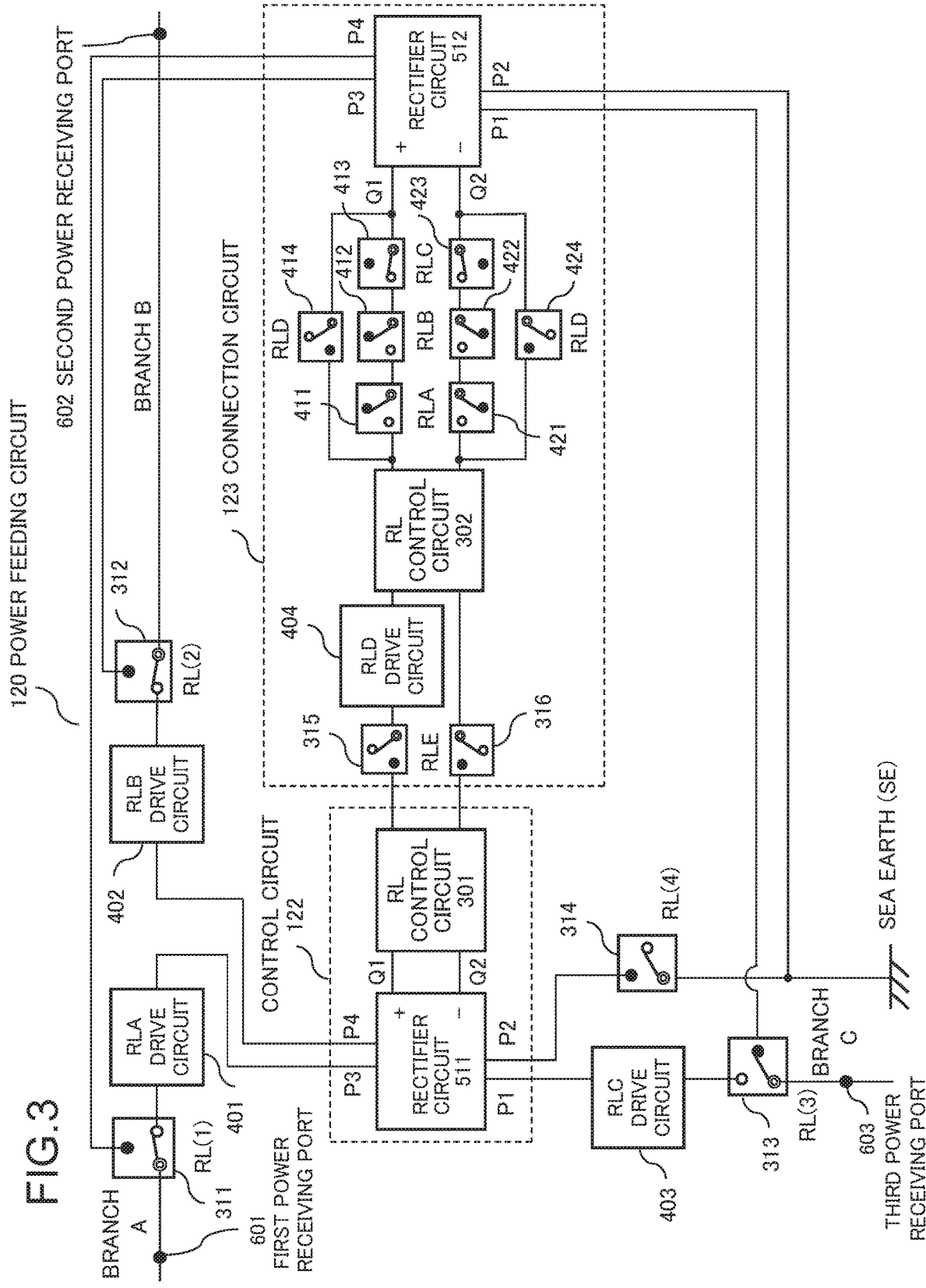
FIG. 3 is a diagram illustrating an example of a power feeding circuit 120.

FIG. 3 is a diagram illustrating an example of the power feeding circuit 120. The power feeding circuit 120 is a circuit related to power feeding of the BU 101. As illustrated in FIG. 1, the power feeding devices 103 to 105 are connected to the branches A, B, and C of the BU 101, respectively. Positions of the first to third power receiving ports 601 to 603 illustrated in FIG. 1 are indicated by black circles in FIG. 3.

First, each part of the power feeding circuit 120 will be described. An RL(1) 311 to an RL(4) 314 are latching relays controlled by an RL control circuit 301. The latching relay maintains a previous connection state after supply of electric power to a control circuit of the relay is lost. The RL(1) 311 to the RL(4) 314 are associated with the switching circuit 121 in FIG. 1. The RL control circuit 301 is a control circuit of the RL(1) 311 to the RL(4) 314, and can control the RL(1) 311 to the RL(4) 314 when power is fed.

RLAs 411 and 421, RLBs 412 and 422, RLCs 413 and 423, RLDs 414 and 424, and RLEs 315 and 316 are non-latching relays. The RLAs 411 and 421, the RLBs 412 and 422, the RLCs 413 and 423, and the RLDs 414 and 424 are turned ON when power is fed to drive circuits of the respective relays. When power feeding is fed to an RL control circuit 302, ON and OFF of the RLEs 315 and 316 are controlled by the RL control circuit 302. All of the non-latching relays are turned OFF after power feeding to the drive circuits or the control circuit is lost. ON and OFF of the relay will be described in FIG. 4.

An RLA drive circuit 401 is a drive circuit of the RLAs 411 and 421. An RLB drive circuit 402 is a drive circuit of the RLBs 412 and 422. An RLC drive circuit 403 is a drive circuit of the RLCs 413 and 423. An RLD drive circuit 404 is a drive circuit of the RLDs 414 and 424. These drive circuits 401 to 404 control ON and OFF of the corresponding relay depending on presence or absence of power feeding. In other words, the RLA drive circuit 401, the RLB drive circuit 402, the RLC drive circuit 403, and the RLD drive circuit 404 are detection circuits serving as a detection means for detecting a power feeding state to a power feeding path. The RLA drive circuit 401, the RLB drive circuit 402, and the RLC drive circuit 403 detect power feeding conditions from the power receiving ports 601, 602, and 603, respectively. The RL control circuit 302 is a control circuit of the RLEs 315 and 316.

Rectifier circuits 511 and 512 are rectifier circuits formed of a diode. The rectifier circuit 511 is configured to be connectable to the branches A to C and the sea earth, and rectifies a power feeding current supplied from the power feeding path and outputs the power feeding current to the RL control circuit 301. The rectifier circuit 512 is configured to be connectable to the branches A to C and the sea earth, and rectifies a power feeding current supplied from the branches A to C and the sea earth and outputs the power feeding current to the RL control circuit 302. The rectifier circuits 511 and the 512 will be described in FIG. 5.

The RL control circuit 301 in FIG. 3 is included in the control circuit 122. Further, the RL control circuit 302, the RLEs 315 and 316, the RLD drive circuit 404, the RLAs 411 and 421, the RLBs 412 and 422, the RLCs 413 and 423, and the RLDs 414 and 424 are included in the connection circuit 123. The rectifier circuit 511 may be included in the control circuit 122. The rectifier circuit 512 may be included in the connection circuit 123. In this way, the power feeding circuit 120 illustrated in FIG. 3 includes the switching circuit 121, the control circuit 122, and the connection circuit 123 that are described in FIG. 1.

Figure 4:
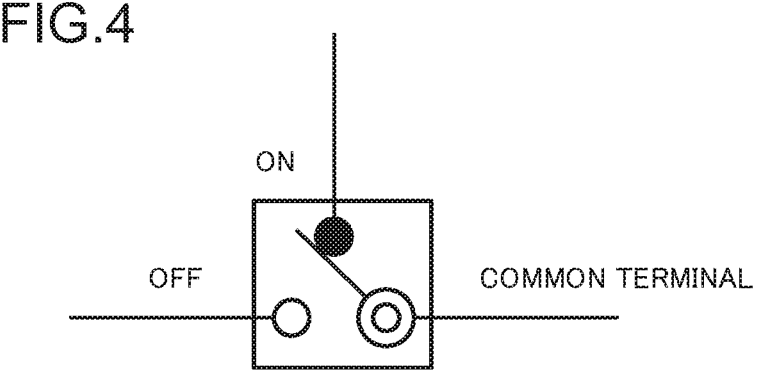
FIG. 4 is a diagram illustrating a connection example inside each relay.

FIG. 4 is a diagram illustrating a connection example inside each of the relays included in the power feeding circuit 120. Each of the relays is a relay having a transfer contact point (c contact point), and a common terminal is indicated by a double circle.

In the present example embodiment, a state where a terminal (ON terminal) indicated by a black circle is connected to the common terminal is referred to as "ON", and a state where a terminal (OFF terminal) indicated by a hollow circle is connected to the common terminal is referred to as "OFF". The common terminal is connected to the ON terminal (black circle) or the Off terminal (white circle) by control by the control circuit or the drive circuit of each of the relays. The expression in FIG. 4 is also used in common with the other drawings. In the present example embodiment, connecting a relay to the ON terminal is described that the "relay is turned ON", and connecting a relay to the OFF terminal is described that the "relay is turned OFF". Wiring between the control circuit or the drive circuit and the relay for turning the relay ON or OFF is omitted in each of the drawings.

Figure 5:
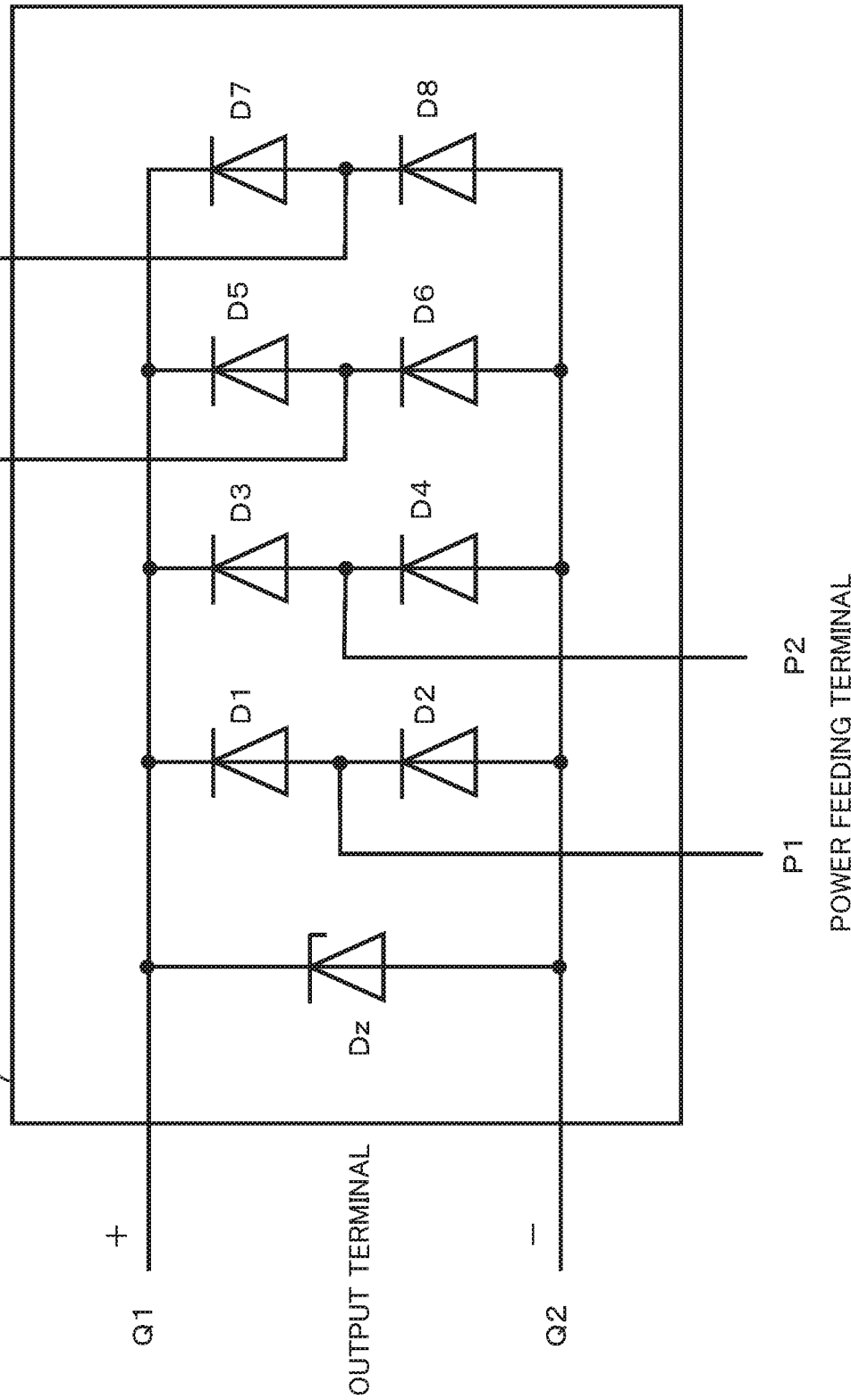
FIG. 5 is an example of a circuit diagram of a rectifier circuit 511.

FIG. 5 is an example of a circuit diagram of the rectifier circuit 511. A circuit diagram of the rectifier circuit 512 is also similar. The rectifier circuit 511 has power feeding terminals P1 to P4 and output terminals Q1 and Q2. The rectifier circuit 511 includes eight diodes D1 to D8 and one Zener diode Dz. The diodes D1 to D8 form a bridge rectifier circuit. P1 to P4 are connected to power feeding paths. A current input from any of the power feeding terminals is rectified by the bridge rectifier circuit and output from Q1 (high potential side) to the outside. A current returning to Q2 (low potential side) from the outside passes through the bridge rectifier circuit and returns to the power feeding path. A current is output from Q1 and the current returns to Q2 regardless of polarity of a power feeding current input to P1 to P4.

A Zener voltage of the Zener diode Dz is selected in such a way as to bring a power feeding current into conduction in reverse direction when Q1 and Q2 are open, and to make a reverse current to be extremely small when power is fed to another circuit from Q1 and Q2. When Q1 and Q2 are open, the input current returns to the power feeding path via the Zener diode Dz.

Figure 6:
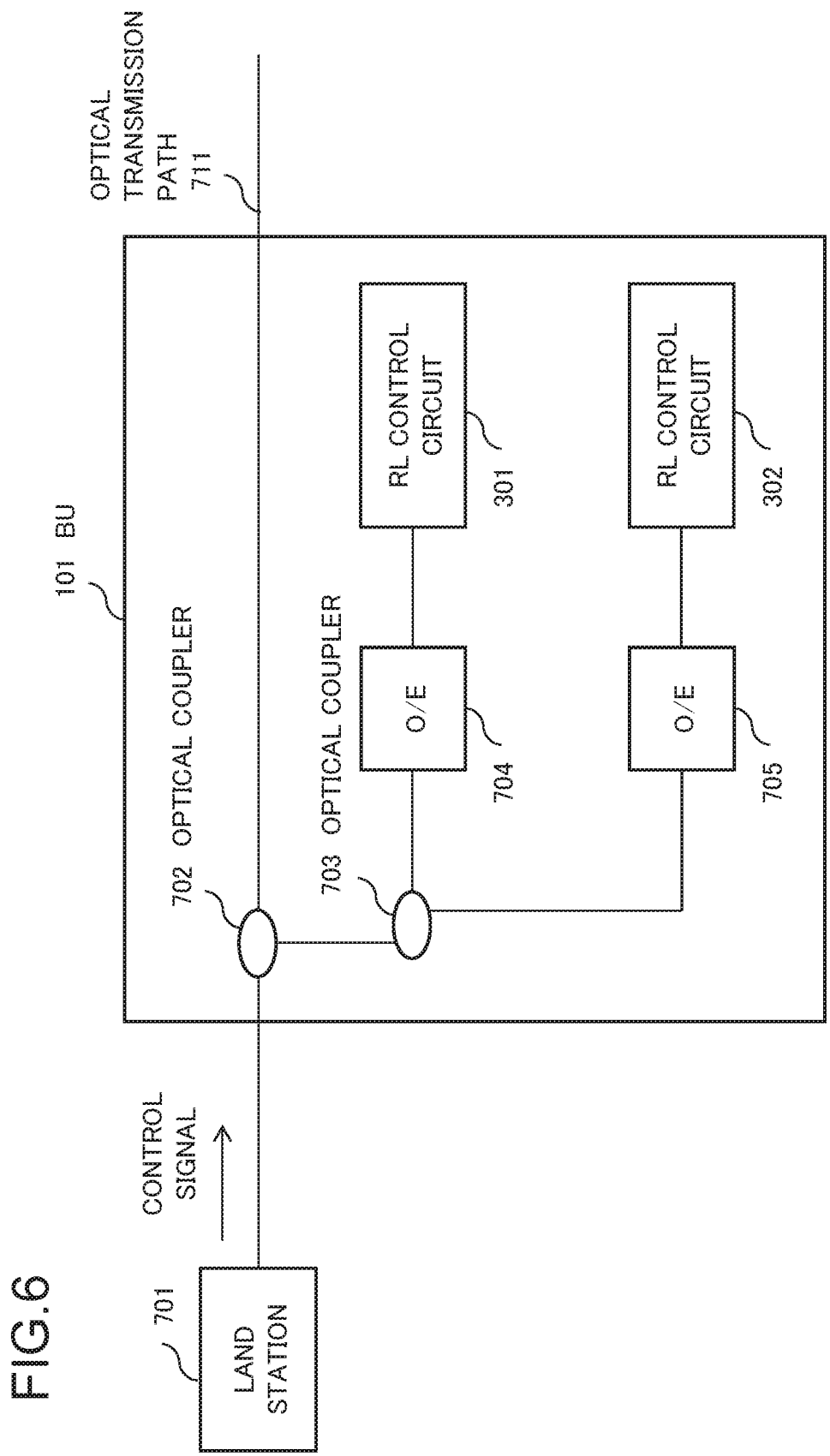
FIG. 6 is a diagram illustrating an example of a path of a control signal of a relay being notified from a land station 701 to a BU 101.

FIG. 6 is a diagram illustrating an example of a path of a control signal of a relay being notified from a land station 701 to the BU 101. The land station 701 is a station building in which an optical communication device that generates a control signal is installed. Any of the power feeding devices 103 to 105 may be installed together at the land station 701. The control signal is transmitted as an optical signal by an optical transmission path 711 such as an optical fiber. The optical transmission path 711 is, for example, a submarine cable including an electric wire used for a power feeding path that connects a power feeding device included in the land station 701 to the BU 101.

The BU 101 includes optical couplers 702 and 703. The optical coupler 702 splits the optical signal that includes the control signal and is received from the land station 701, and inputs the optical signal to optical/electrical (O/E) conversion circuits 704 and 705. The 0/E conversion circuits 704 and 705 convert the optical signal into an electric signal, and outputs the electric signal including the control signal to the RL control circuits 301 and 302. The RL control circuits 301 and 302 extract the control signals to be processed by each of the RL control circuits 301 and 302 from the electric signal input from the 0/E conversion circuit 704 or 705, and controls a subordinate relay, based on the extracted control signal. However, the RL control circuits 301 and 302 may also autonomously control the relay without depending on an instruction of the control signal. The RL control circuit 301 controls the RL(1) 311, the RL(2) 312, the RL(3) 313, and the RL(4) 314. The RL control circuit 302 controls the RLEs 315 and 316. Note that, even when an abnormality occurs in the submarine cable or the repeater, the control signal from the land station 701 can reach the BU 101 unless the optical transmission path 711 is cut or a loss in the optical transmission path 711 including the repeater increases.

(Detailed Description of Operation)

An operation of the power feeding circuit 120 when power is fed by a power feeding path via the branch A and the branch B and when power cannot be fed by the power feeding path will be described by using FIGS. 7 to 10.

Figure 7:
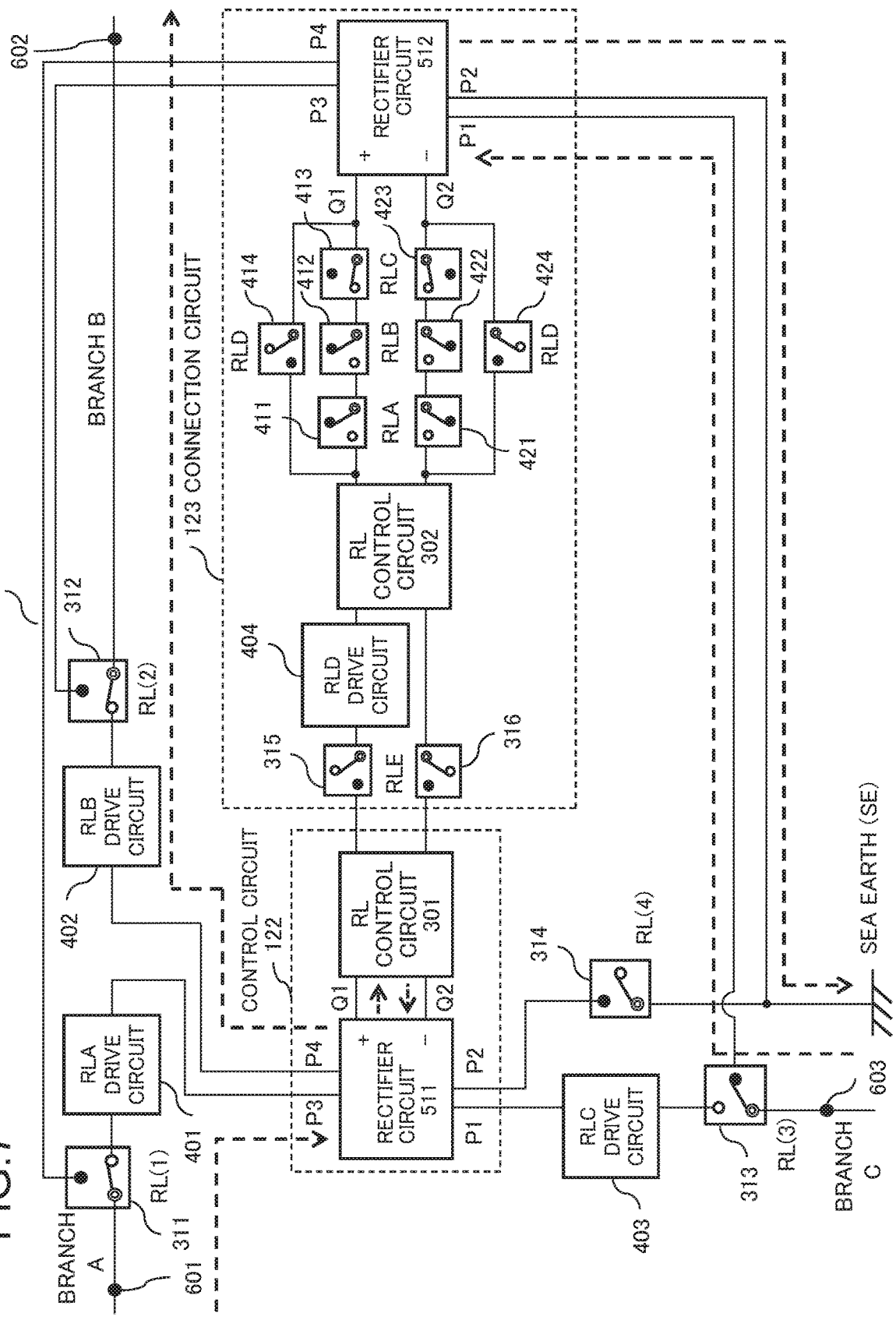
FIG. 7 is a diagram illustrating a normal state where a power feeding current flows from a branch A to a branch B in the power feeding circuit 120.

FIG. 7 is a diagram illustrating a normal state where a power feeding current flows from the branch A to the branch B in the power feeding circuit 120. In the following drawings, an arrow of a broken line is a power feeding current exemplified for description. In FIG. 7, the RL(1) 311, the RL(2) 312, and the RL(4) 314 are OFF, and only the RL(3) 313 is ON. The power feeding path via the branch A and the branch B supplies electric power to the RL control circuit 301 via the rectifier circuit 511. The branch C is disconnected from the rectifier circuit 511 by the RL(3) 313.

In FIG. 7, the power feeding current flows to the RLA drive circuit 401 and the RLB drive circuit 402, and thus the RLAs 411 and 421 and the RLBs 412 and 422 are ON. Further, since the RLE 315 is OFF, power is not fed to the RLD drive circuit 404. As a result, the RLDs 414 and 424 are OFF. Therefore, the output terminals Q1 and Q2 of the rectifier circuit 512 are not connected to the RL control circuit 302, and the output terminals Q1 and Q2 are open. As a result, a power feeding current of the branch C connected to the power feeding terminal P1 of the rectifier circuit 512 flows to the sea earth connected to the power feeding terminal P2 via the Zener diode Dz.

In this way, when the power feeding path is normal, power is fed to the RL control circuit 301 via the branch A and the branch B. Therefore, the RL control circuit 301 can control the RL(1) 311 to the RL(4) 314. On the other hand, the power feeding path via the branch C and the connection circuit 123 are disconnected from the RL control circuit 301.

Figure 8:
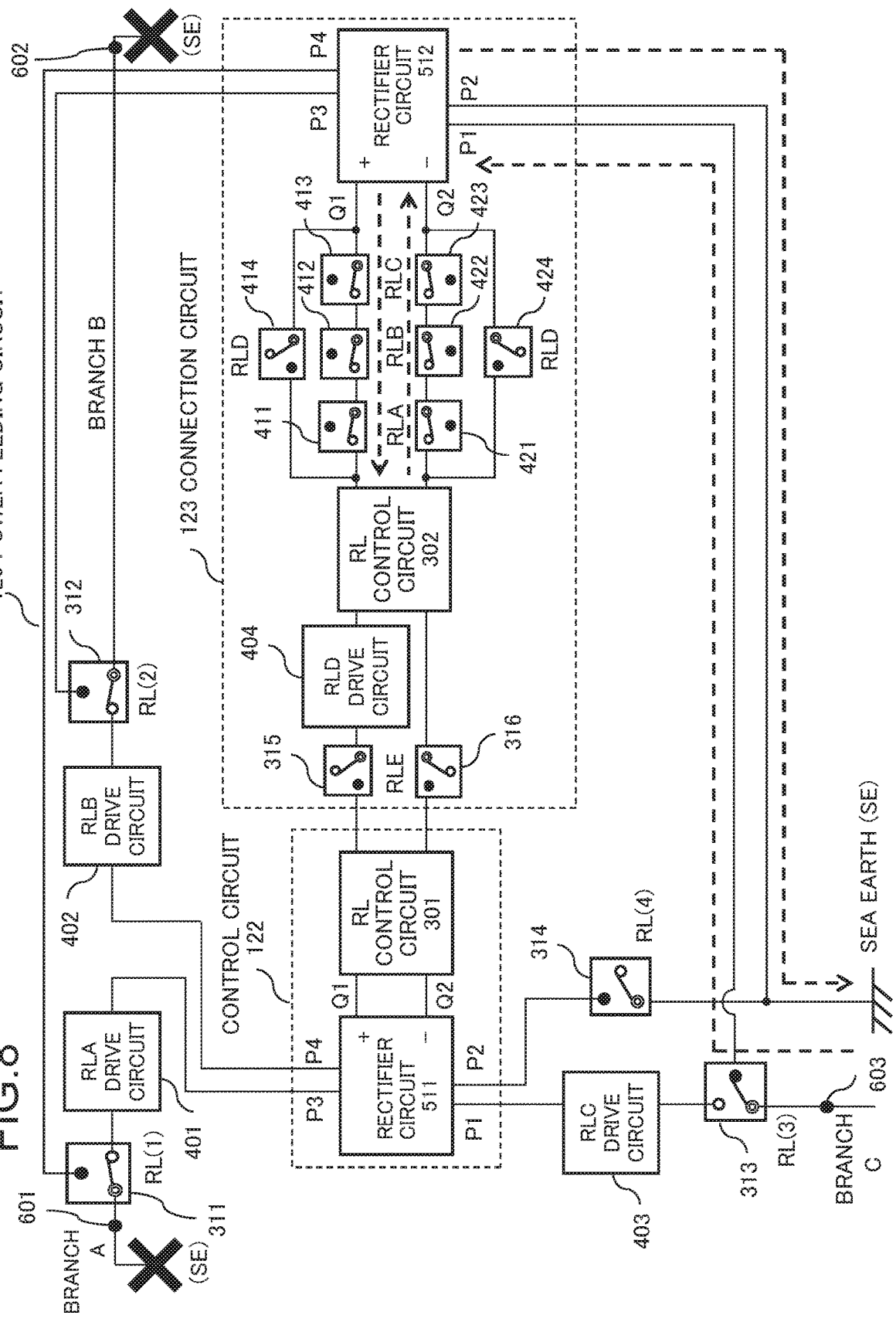
FIG. 8 is a first diagram illustrating an operation of the power feeding circuit when power feeding via the branch A and the branch B is cut off.

FIG. 8 is a first diagram illustrating an operation of the power feeding circuit when both of power feeding via the branch A and power feeding via the branch B are cut off. For example, this applies to when a ground fault occurs on the power feeding paths of both of the branch A and the branch B, or when an open fault occurs on the power feeding path of at least one of the branch A and the branch B. When a ground fault occurs on the power feeding paths of both of the branch A and the branch B, power feeding from the power feeding devices 103 and 104 to the RL control circuit 301 is lost. Further, when an open fault occurs on the power feeding path of one of the branch A and the branch B, the power feeding path via the branch A and the branch B cannot be formed, and thus power feeding to the RL control circuit 301 is also lost. The RL(1) 311 and the RL(2) 312 are turned OFF by the RL control circuit 301 before the fault occurs. Since the RL(1) 311 and the RL(2) 312 are latching relays, the RL(1) 311 and the RL(2) 312 maintain the "OFF" state even when power feeding from both of the branches A and B is subsequently cut off and the RL control circuit 301 does not operate.

In FIG. 8, description is given by taking, as an example, a case where a ground fault occurs on the power feeding paths of both of the branch A and the branch B. In FIGS. 8 to 10 and FIG. 12, "X" marks of the branch A and the branch B indicate that the power feeding paths are connected to the sea earths due to the ground fault. When the power feeding path of the branch A is cut off, power is not fed to the RLA drive circuit 401. Thus, the RLAs 411 and 421 change from ON to OFF. Similarly, the power feeding path of the branch B is cut off, and thus power is also not fed to the RLB drive circuit 402. Thus, the RLBs 412 and 422 change from ON to OFF.

Giving an attention to the branch C, the RL(3) 313 is turned ON by the RL control circuit 301 before the fault occurs. Since the RL(3) 313 is a latching relay, the RL(3) 313 maintains the "ON" state even when power feeding from both of the branches A and B is subsequently cut off and the RL control circuit 301 does not operate. Therefore, after power feeding to both of the branches A and B is cut off, power is also not supplied to the RLC drive circuit 403. As a result, the RLCs 413 and 423 maintain the OFF state before and after power feeding from both of the branches A and B is cut off.

In other words, when power feeding from both of the branch A and the branch B is cut off, the RLAs 411 and 421, the RLBs 412 and 422, and the RLCs 413 and 423 are turned OFF. As a result, the output terminals Q1 and Q2 of the rectifier circuit 512 are connected to the RL control circuit 302 through these relays.

A current starts flowing to the RL control circuit 302 upon the connection between the rectifier circuit 512 and the RL control circuit 302, and thus a voltage between both ends of the Zener diode Dz of the rectifier circuit 512 decreases to be equal to or lower than a Zener voltage and the Zener diode Dz is turned OFF. Therefore, all currents flowed to the Zener diode Dz of the rectifier circuit 512 become to flow to the RL control circuit 302.

Power feeding to the RL control circuit 302 brings the RL control circuit 302 into a state ("standby state") where the RLEs 315 and 316 can be controlled.

Figure 9:
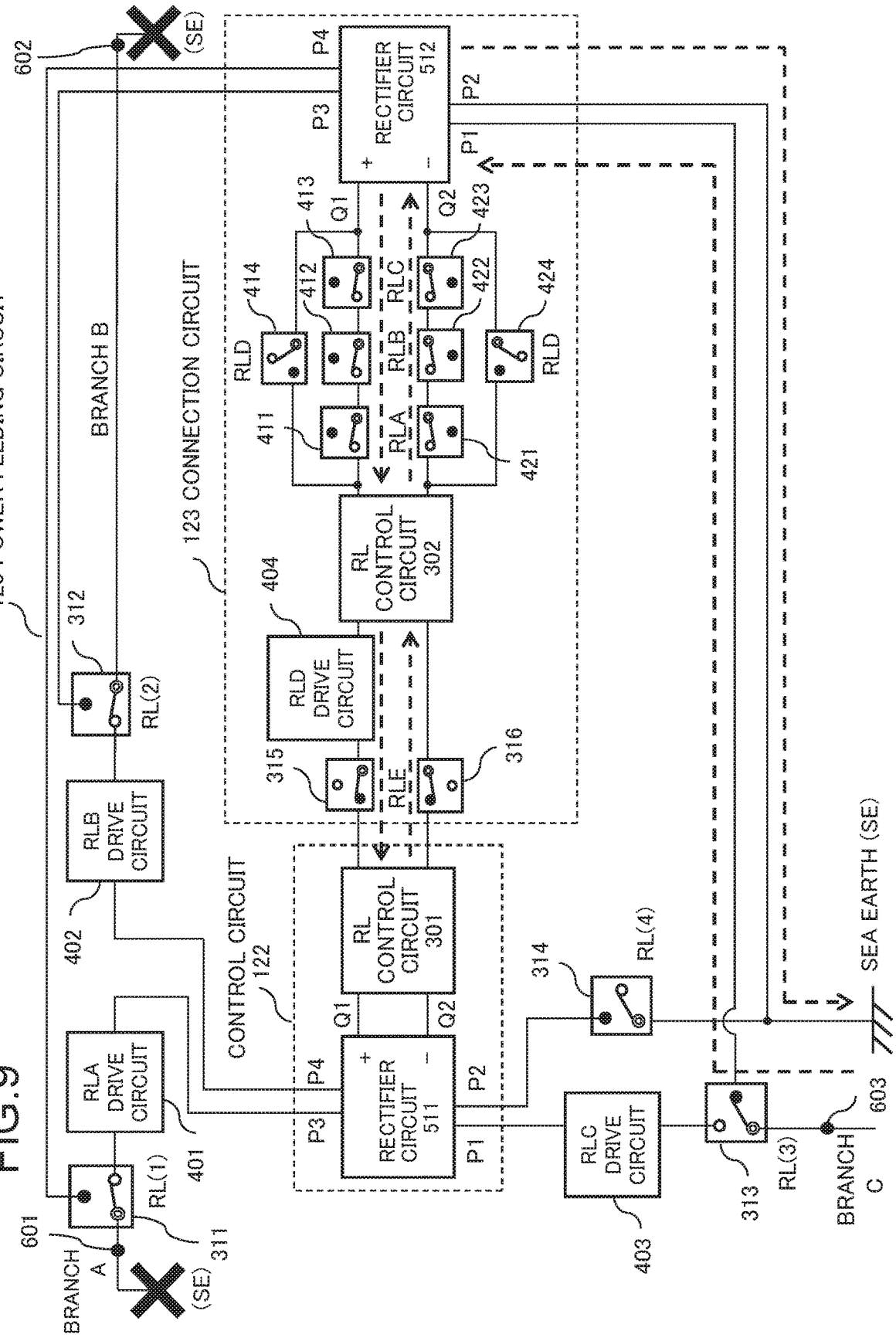
FIG. 9 is a second diagram illustrating an operation of the power feeding circuit when power feeding via the branch A and the branch B is cut off.

FIG. 9 is a second diagram illustrating an operation of the power feeding circuit when power feeding via the branch A and the branch B is cut off. With reference to FIG. 9, the RL control circuit 302 turns the RLEs 315 and 316 ON by power feeding from the rectifier circuit 512. As a result, power is fed to the RLD drive circuit 404 and the RL control circuit 301 via the RL control circuit 302. The control of turning the RLEs 315 and 316 ON may be performed based on a control signal received from the land station by the RL control circuit 302 by using the function described in FIG. 6. The land station may transmit the control signal by detecting an abnormality on the power feeding paths of the branch A and the branch B. By designing a circuit in such a way that the O/E conversion circuit 705 operates by power feeding from the RL control circuit 302, the O/E conversion circuit 705 can process the control signal received from the land station even when power feeding via the branches A and B is lost. Alternatively, the RL control circuit 302 may be triggered by start of power feeding to the RL control circuit 302 and then autonomously turn the RLEs 315 and 316 ON.

Figure 10:
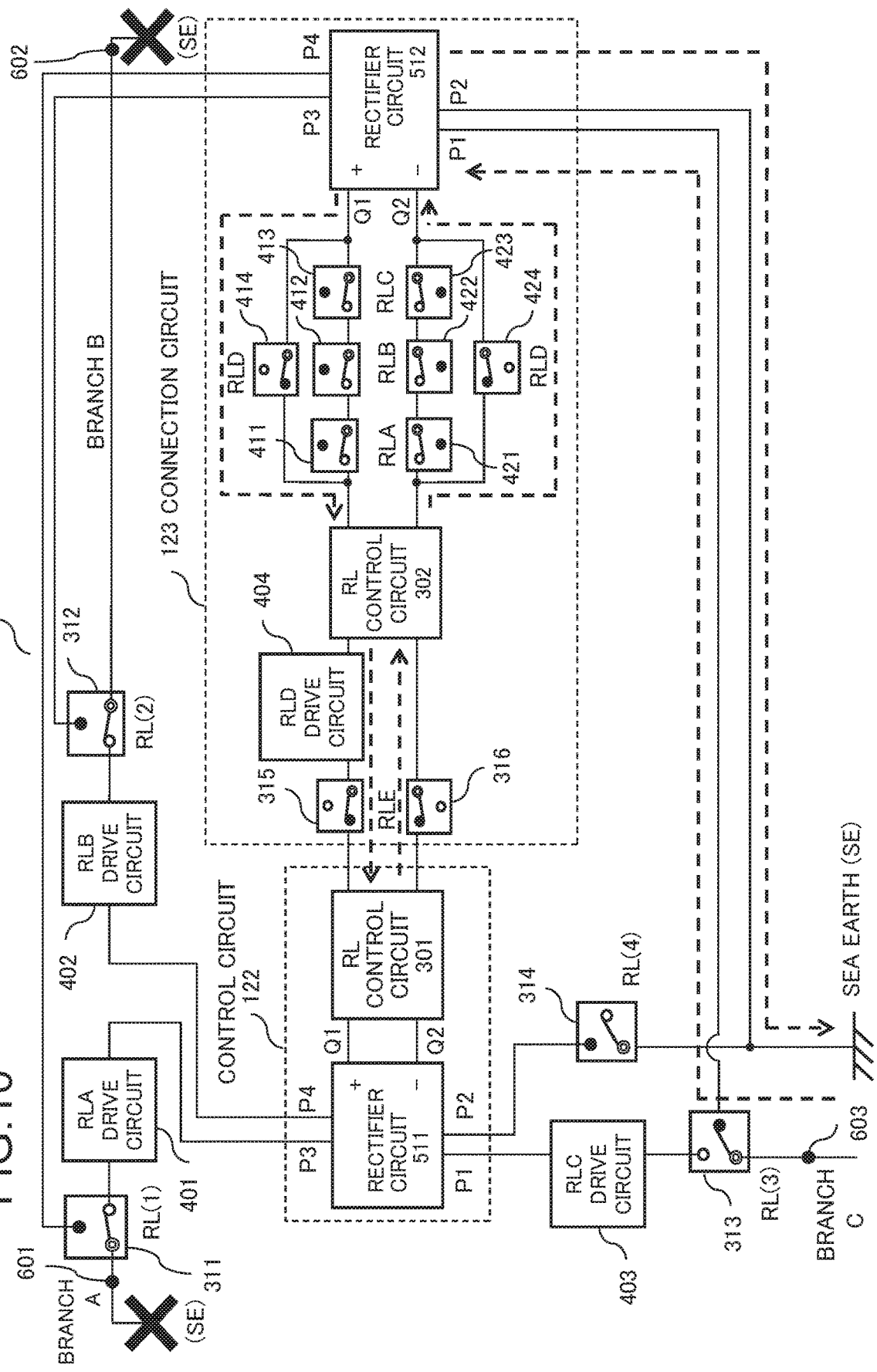
FIG. 10 is a third diagram illustrating an operation of the power feeding circuit when power feeding via the branch A and the branch B is cut off.

FIG. 10 is a third diagram illustrating an operation of the power feeding circuit when power feeding via the branch A and the branch B is cut off. Power is fed to the RLD drive circuit 404 by the RLEs 315 and 316 being turned ON. As a result, as illustrated in FIG. 10, the RLDs 414 and 424 are turned ON. Herein, a case where power feeding from both of the branch A and the branch B is cut off and power feeding via the branch A is then restored will be considered. When a current flows to the RLA drive circuit 401 due to the restoration of power feeding, the RLAs 411 and 421 are turned ON. When a current flows to the RLB drive circuit 402, the RLBs 412 and 422 are turned ON. In both of the cases, a series circuit of the RLA 411, the RLB 412, and the RLC 413 and a series circuit of the RLA 421, the RLB 422, and the RLC 423 do not perform conduction. However, the RLDs 414 and 424 maintain the ON state by turning on the RLD drive circuit 404. Thus, even when power feeding from one of the branch A and the branch B is restored, power feeding from the rectifier circuit 512 to the RL control circuit 301 is maintained by interposing the RLDs 414, 424 and the RL control circuit 302.

In this way, the power feeding path to the RL control circuit 301 is formed by using the connection circuit 123, and the RL(1) 311 to the RL(4) 314 can be controlled by the RL control circuit 301. When power feeding to the control circuit 122 of the BU 101 is lost during a double ground fault or an open fault on the power feeding path, the connection circuit 123 is in the standby state. Then, power feeding to the RL control circuit 301 can be achieved by connecting the power feeding path to the control circuit 122 via the connection circuit 123.

The power feeding path via the rectifier circuit 511 when power feeding from the branch A is restored will be described. Power feeding via the branch A and the rectifier circuit 511 is connected to the sea earth by turning the RL(4) 314 ON by the RL control circuit 301. Herein, when power feeding can be achieved from both of the rectifier circuits 511 and 512, the RL control circuit 301 may be designed in such a way as to operate by power feeding from the rectifier circuit 512. For example, by providing the RL control circuit 301 with a relay that disconnects the power feeding path from the rectifier circuit 511 from power feeding from the connection circuit 123, the RL control circuit 301 achieves such a function. In FIG. 10, the power feeding path from the rectifier circuit 511 is disconnected in the RL control circuit 301 by this function. Then, a power feeding current of the branch A passes through the Zener diode Dz of the rectifier circuit 511 and the RL(4) 314, and flows to the sea earth. When the connection circuit 123 is disconnected from the RL control circuit 301, the RL control circuit 301 can operate by power feeding from the rectifier circuit 511.

Figure 11:
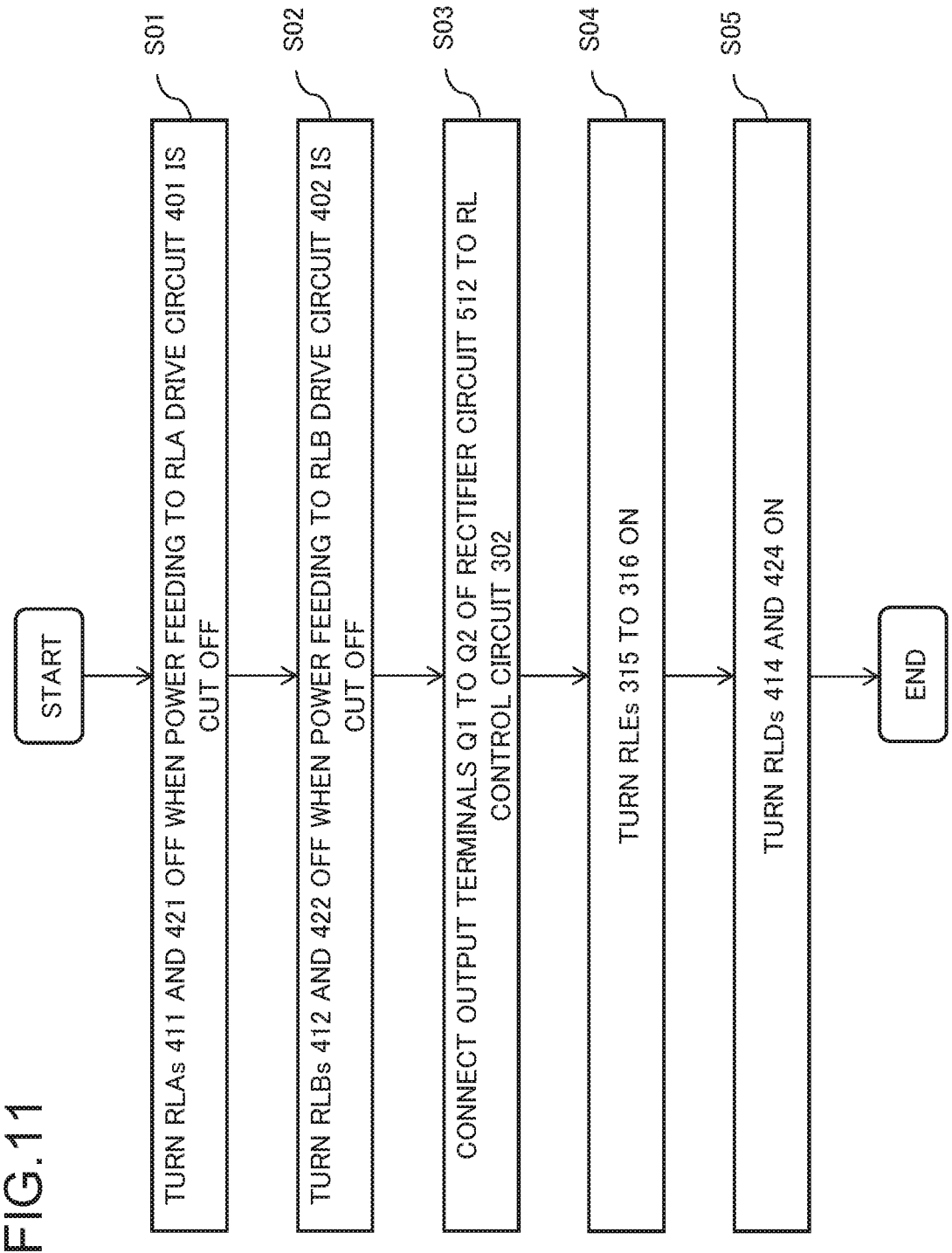
FIG. 11 is a flowchart illustrating an operation example of the power feeding circuit 120.

FIG. 11 is a flowchart illustrating an operation example of the power feeding circuit 120 described in FIGS. 8 to 10. The power feeding circuit 120 turns the RLAs 411 and 421 OFF when power feeding to the RLA drive circuit 401 is cut off (Step S01 in FIG. 11). Further, the power feeding circuit 120 turns the RLBs 412 and 422 OFF when power feeding to the RLB drive circuit 402 is cut off (Step S02). Then, the power feeding circuit 120 connects the output terminals Q1 and Q2 of the rectifier circuit 512 to the RL control circuit 302 (Step S03). Thus, power is fed to the RL control circuit 302. The RL control circuit 302 turns the RLEs 315 and 316 ON (Step S04). Further, the RLDs 414 and 424 are turned ON by power feeding to the RLD drive circuit 404 (Step S05). The order of Step S01 and Step S02 is not restricted, and the order of Step S04 and Step S05 is not restricted either.

Figure 12:
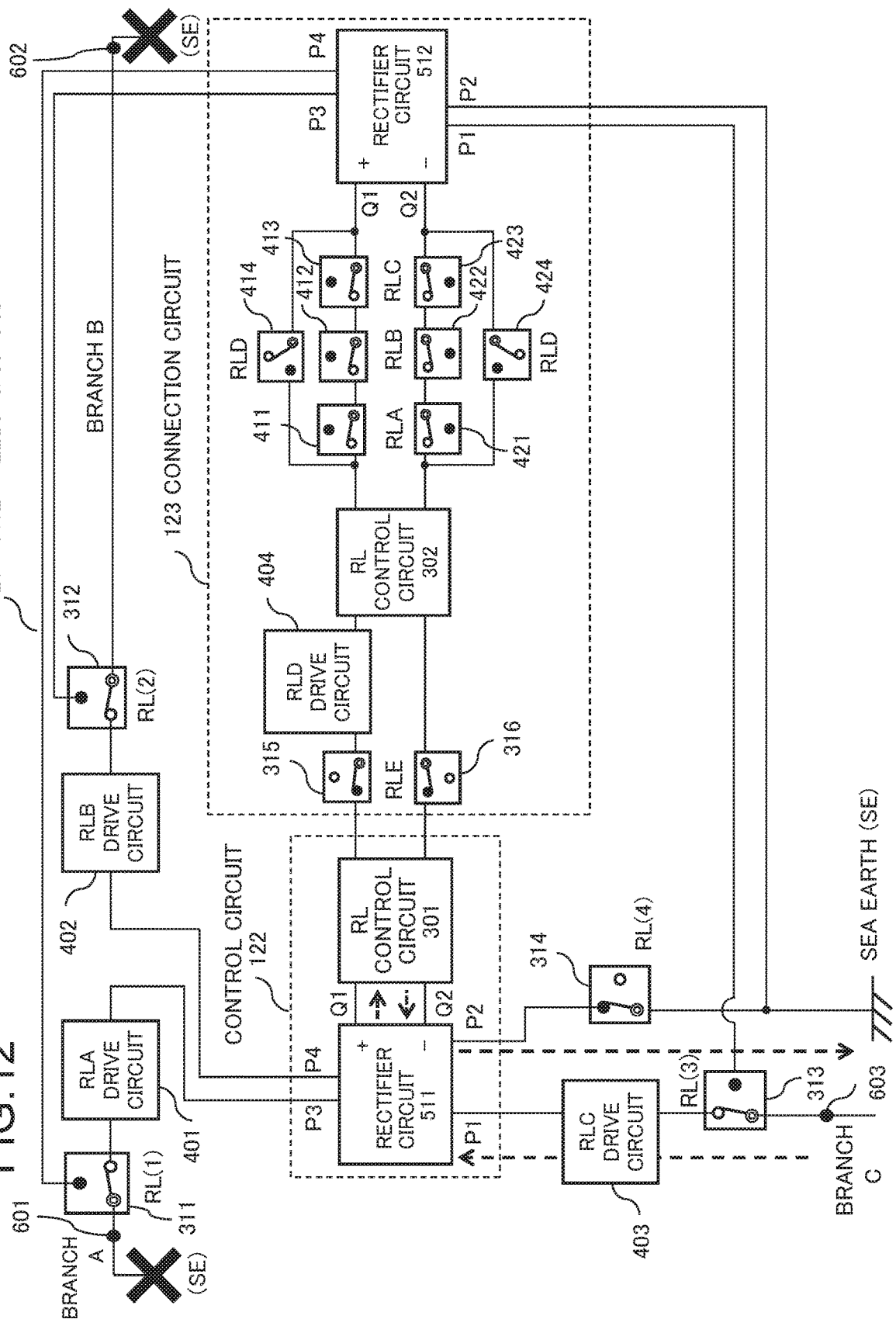
FIG. 12 is a first diagram illustrating switching of a power feeding path via a branch C.
Figure 13:
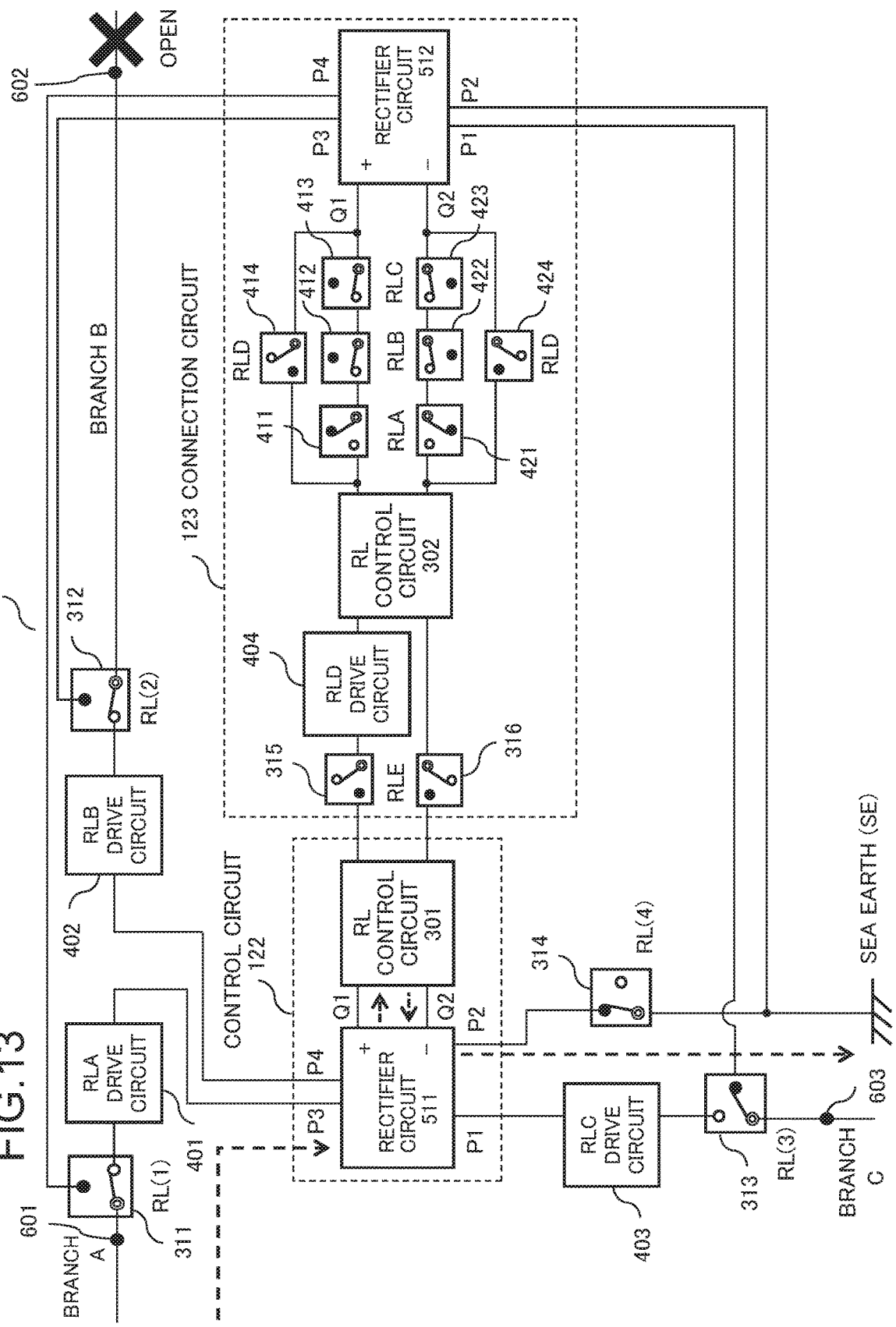
FIG. 13 is a second diagram illustrating switching of the power feeding path via the branch C.
Figure 14:
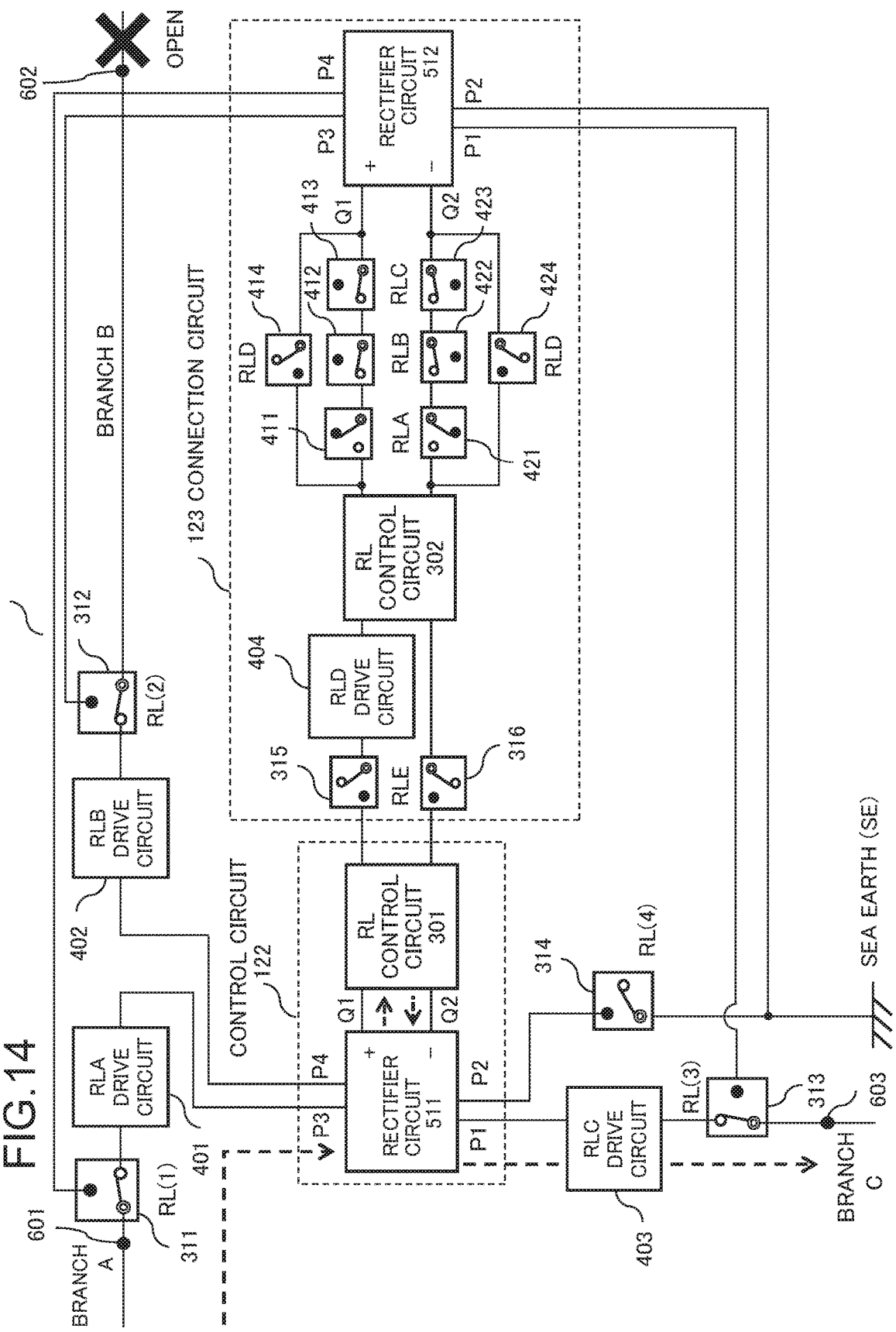
FIG. 14 is a third diagram illustrating switching of the power feeding path via the branch C.

In FIG. 10, the state where power is fed to the RL control circuit 301 via the connection circuit 123 is described. In FIGS. 12 to 14, an operation example of the power feeding circuit 120 after the state in FIG. 10 will be described.

FIG. 12 is a first diagram illustrating an example of switching a power feeding path via the branch C. In FIG. 12, a case where a ground fault occurs in both of the branch A and the branch B, and power feeding of the RL control circuit 301 is switched to power feeding from the rectifier circuit 512. As described in FIG. 10, power feeding to the control circuit 122 via the connection circuit 123 starts due to the ground fault. Subsequently, as illustrated in FIG. 12, the RL control circuit 301 may turn the RL(3) 313 OFF and turn the RL(4) 314 ON, and may switch to a path without passing through the connection circuit 123 between the third power receiving port and the sea earth. Such control can change power feeding from the branch C to the RL control circuit 301 from power feeding via the rectifier circuit 512 to power feeding via the rectifier circuit 511. Such switching of a power feeding path disconnects the connection circuit 123 from the power feeding path of the RL control circuit 301 and reduces electric circuits through which a power feeding current passes. Thus, a voltage drop (namely, power consumption) on the power feeding path is reduced, and reliability of the power feeding path also improves.

When the power feeding circuit 120 is in the state in FIG. 12, the RL control circuit 301 may further turn the RL(1) 311 ON. An ON-side terminal of the RL(1) 311 is connected to the sea earth by interposing the Zener diode Dz of the rectifier circuit 512. Thus, a voltage of a ground point on the power feeding circuit 120 side of the branch A is equal to or less than a Zener voltage of the Zener diode Dz by the RL(1) 311 being turned ON. For this reason, application of an unexpected high voltage to a fault place of the branch A from the power feeding circuit 120 during work on the fault place of the branch A can be avoided, and safety of the work can be increased. The same also applies to the power feeding path of the branch B. In other words, application of an unexpected high voltage to a fault place of the branch B from the power feeding circuit 120 side can be avoided by turning the RL(2) 312 ON by the RL control circuit 301.

FIGS. 13 and 14 are a second diagram and a third diagram illustrating switching of the power feeding path via the branch C. In FIGS. 13 and 14, a case where an open fault occurs in the branch B will be described. In FIGS. 13 and 14, an "X" mark of the branch B indicates that the power feeding path is open due to the open fault. When the open fault occurs in the branch B, power feeding via the branch C also starts as described in FIGS. 8 to 10. Subsequently, the RL control circuit 301 turns the RL(4) 314 ON, and the RL control circuit 302 also turns at least one of the RLEs 315 and 316 OFF. A power feeding current of the RL control circuit 301 via the branch A and the rectifier circuit 511 can be connected to the sea earth via the RL(4) 314 by such control. Further, because the RLA drive circuit 401 turns on and the RLD drive circuit 404 turns off, the RLAs 411 and 421 are turned ON and the RLDs 414 and 424 are turned OFF. As a result, the power feeding path between the control circuit 122 and the connection circuit 123 is disconnected.

On the other hand, in FIG. 14, after power feeding via the connection circuit 123 starts, the RL control circuit 301 turns the RL(3) 313 OFF, and the RL control circuit 302 also turns at least one of the RLEs 315 and 316 OFF. In FIG. 14, a power feeding current of the RL control circuit 301 from the branch A is not connected to the sea earth, and is connected to the power feeding path via the branch C. Such connection can be achieved when magnitude of a power feeding current via the branch C (namely, a power feeding current of the power feeding device 105 in FIG. 1) is the same as magnitude of a power feeding current via the branch A, and directions of the currents are opposite. For example, when the power feeding device 103 in FIG. 1 is a positive voltage, the power feeding device 105 is a negative voltage, and both power feeding currents are the same, such power feeding path can be formed.

The case where the open fault occurs in the branch B is described in FIGS. 13 and 14. However, when an open fault occurs in the branch A, the connection circuit 123 can also be disconnected from the control circuit 122, and the power feeding path via the branch B, the control circuit 122, and the branch C can be formed by a similar procedure.

[0054]

Since the control of the relay described in FIGS. 13 and 14 also reduces electric parts through which a power feeding current passes similarly to the example in FIG. 12, a voltage drop on the power feeding path is reduced, and reliability of the power feeding path also improves.

As described above, in the submarine branching unit (BU) 101 according to the first example embodiment, the connection circuit 123 feeds power to the control circuit 122 when power feeding is lost, and thus switching control of a power feeding path can be achieved even when a ground fault and an open fault occur on the power feeding path.

Second Example Embodiment

Figure 15:
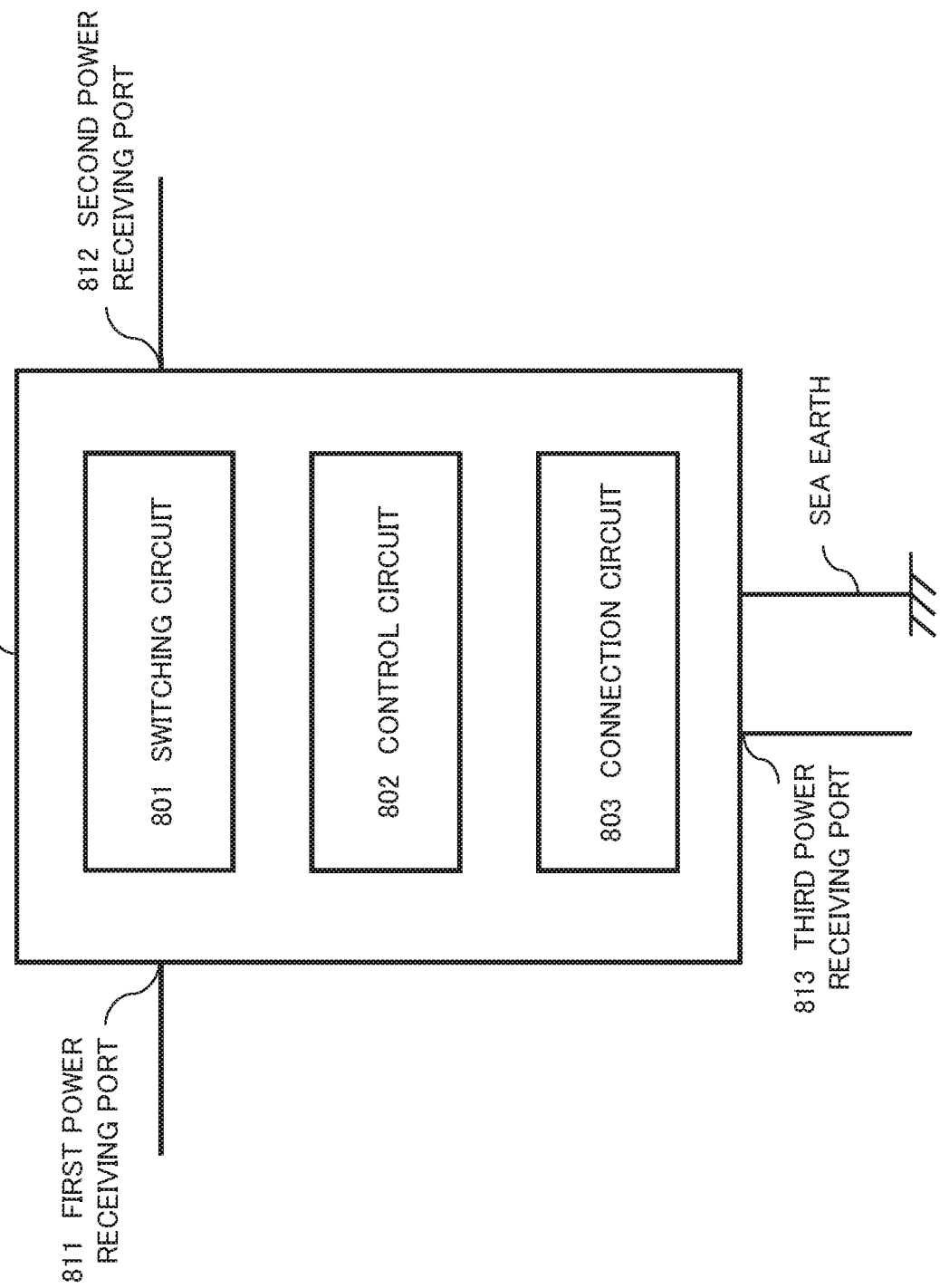
FIG. 15 is a block diagram illustrating an example of a configuration of a submarine branching unit 800 according to a second example embodiment.
Figure 16:
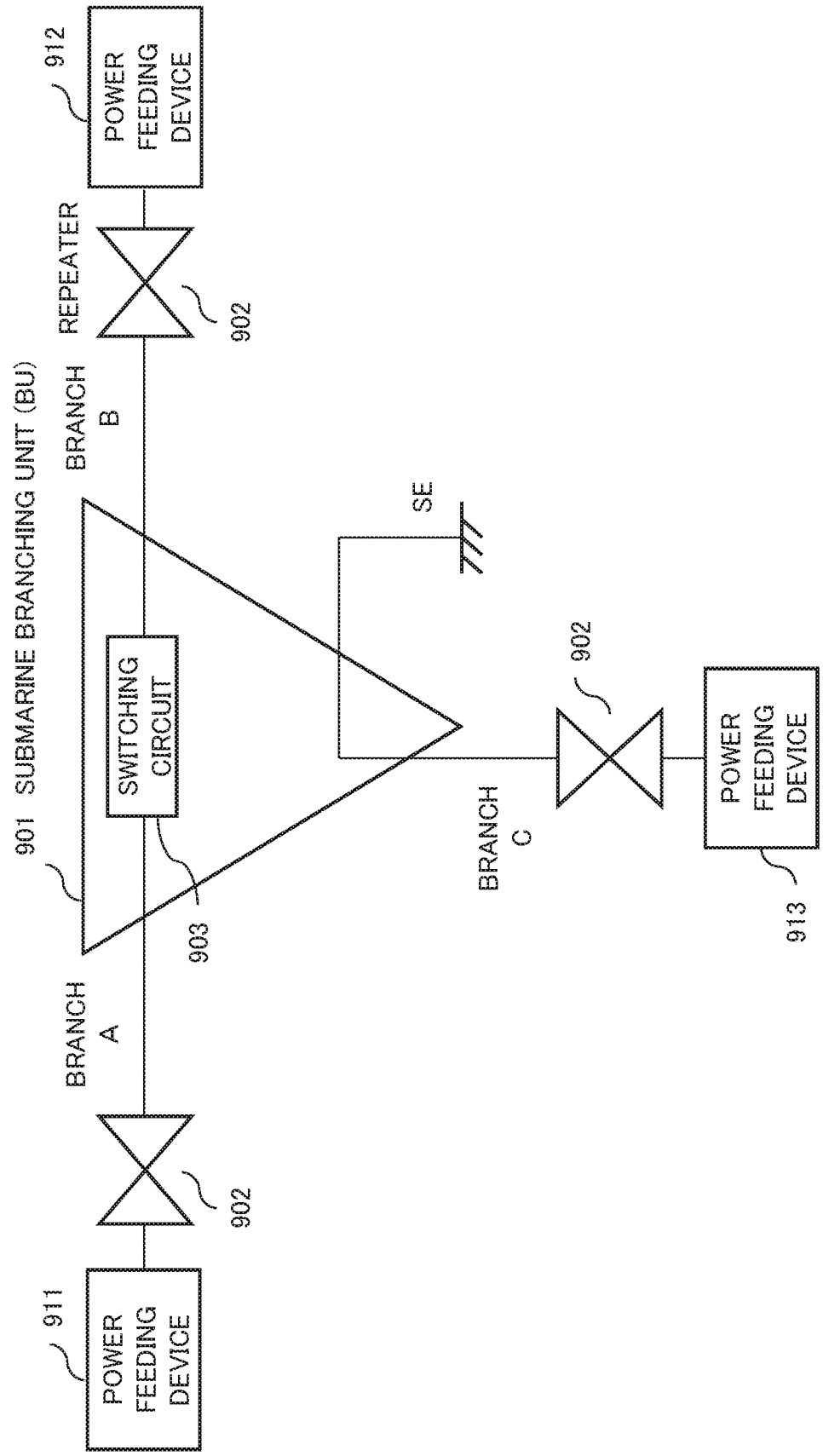
FIG. 16 is a diagram illustrating a power feeding path of a general submarine cable system 900 using a submarine branching unit (BU).
Figure 17:
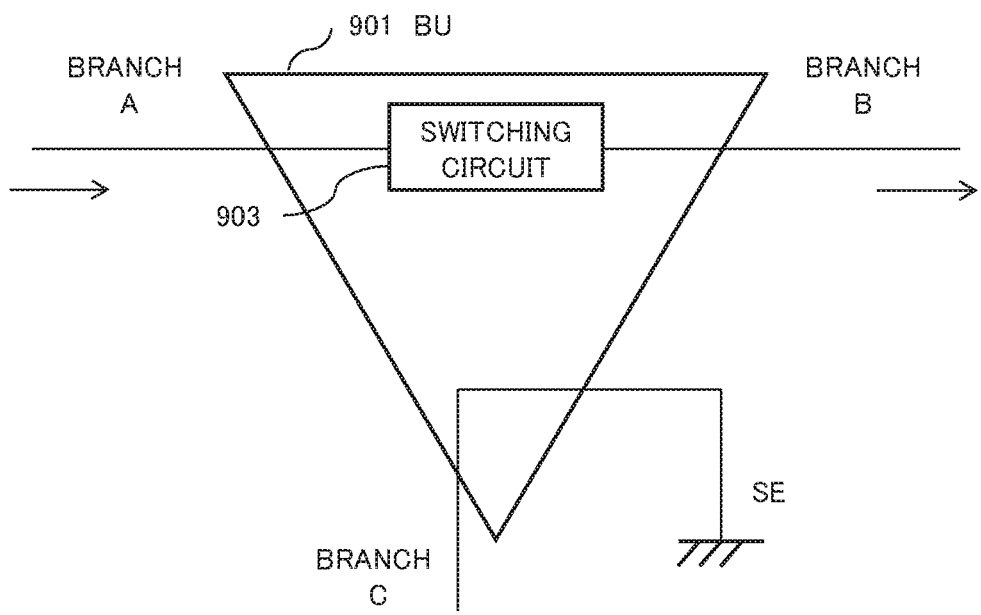
FIG. 17 is a first diagram illustrating a power feeding path of a BU 901.
Figure 18:
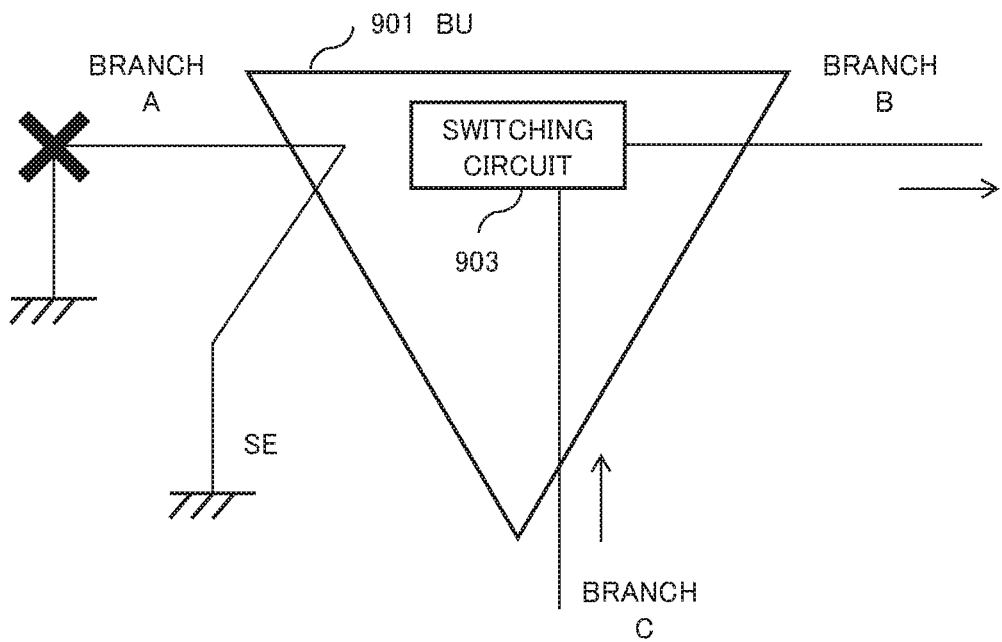
FIG. 18 is a second diagram illustrating a power feeding path of the BU 901.
Figure 19:
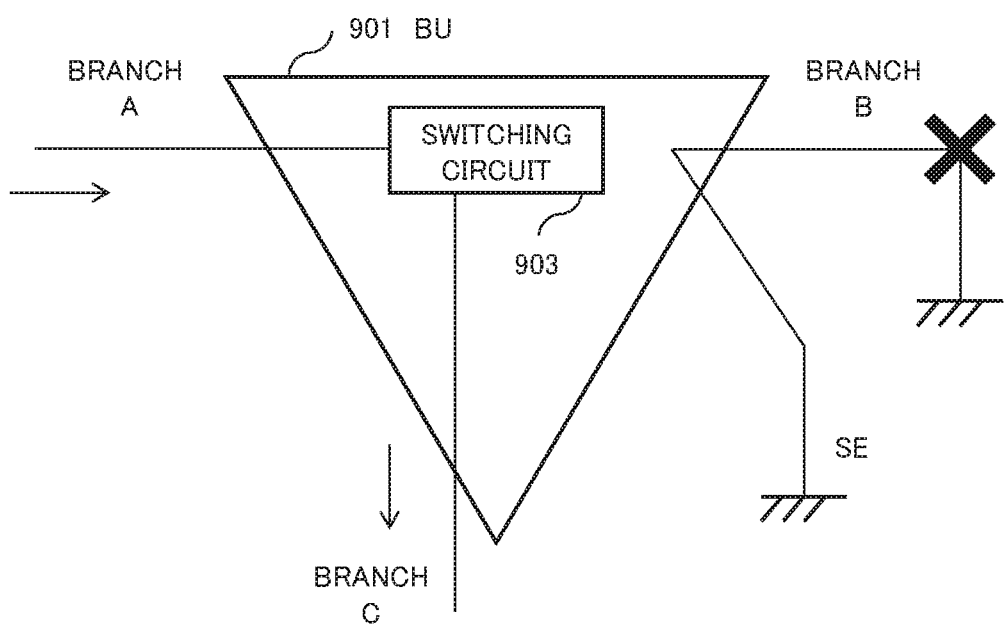
FIG. 19 is a third diagram illustrating a power feeding path of the BU 901.
Figure 20:
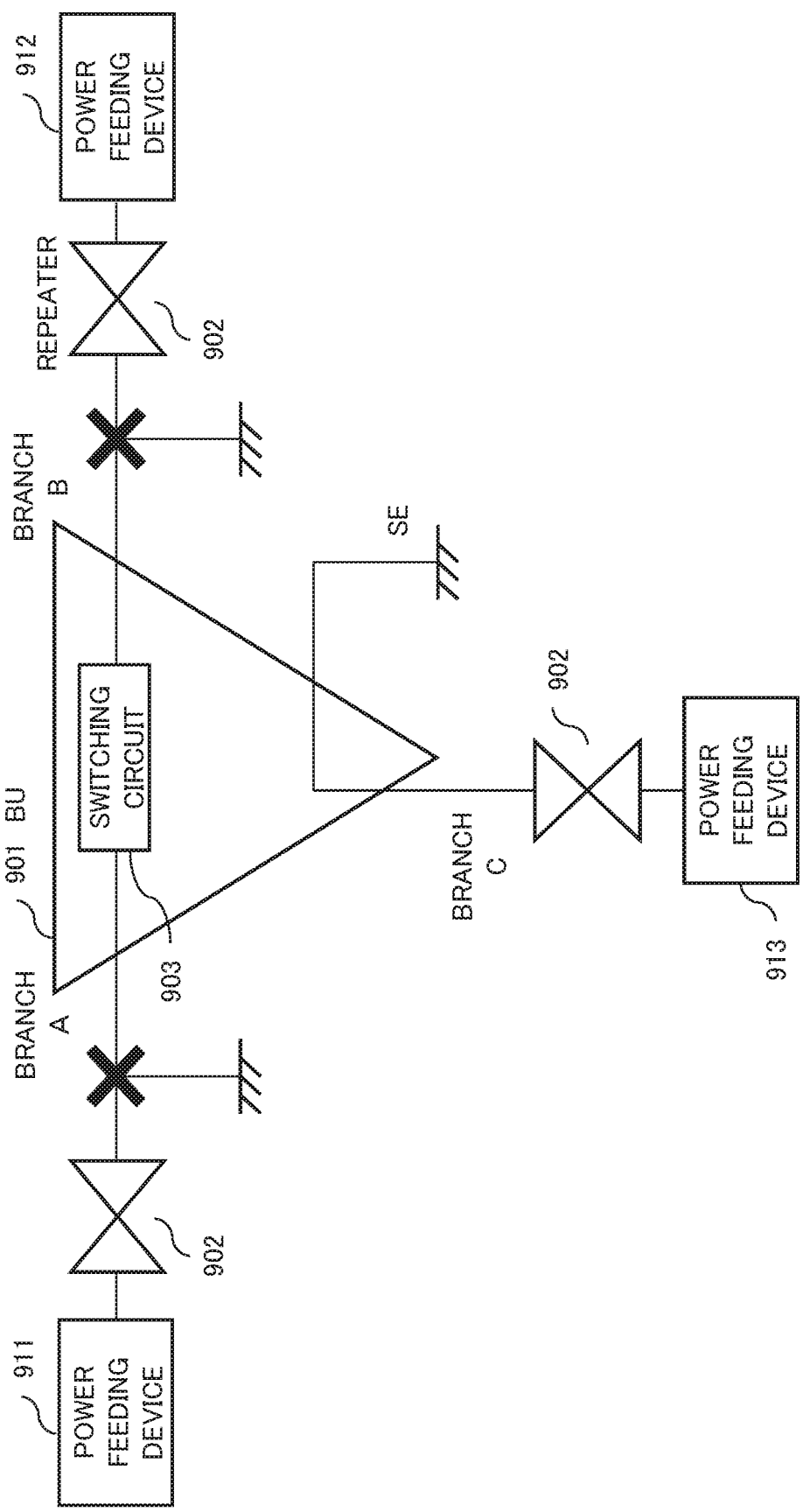
FIG. 20 is a first diagram illustrating an example of a fault that electric power is not supplied to a switching circuit 903.
Figure 21:
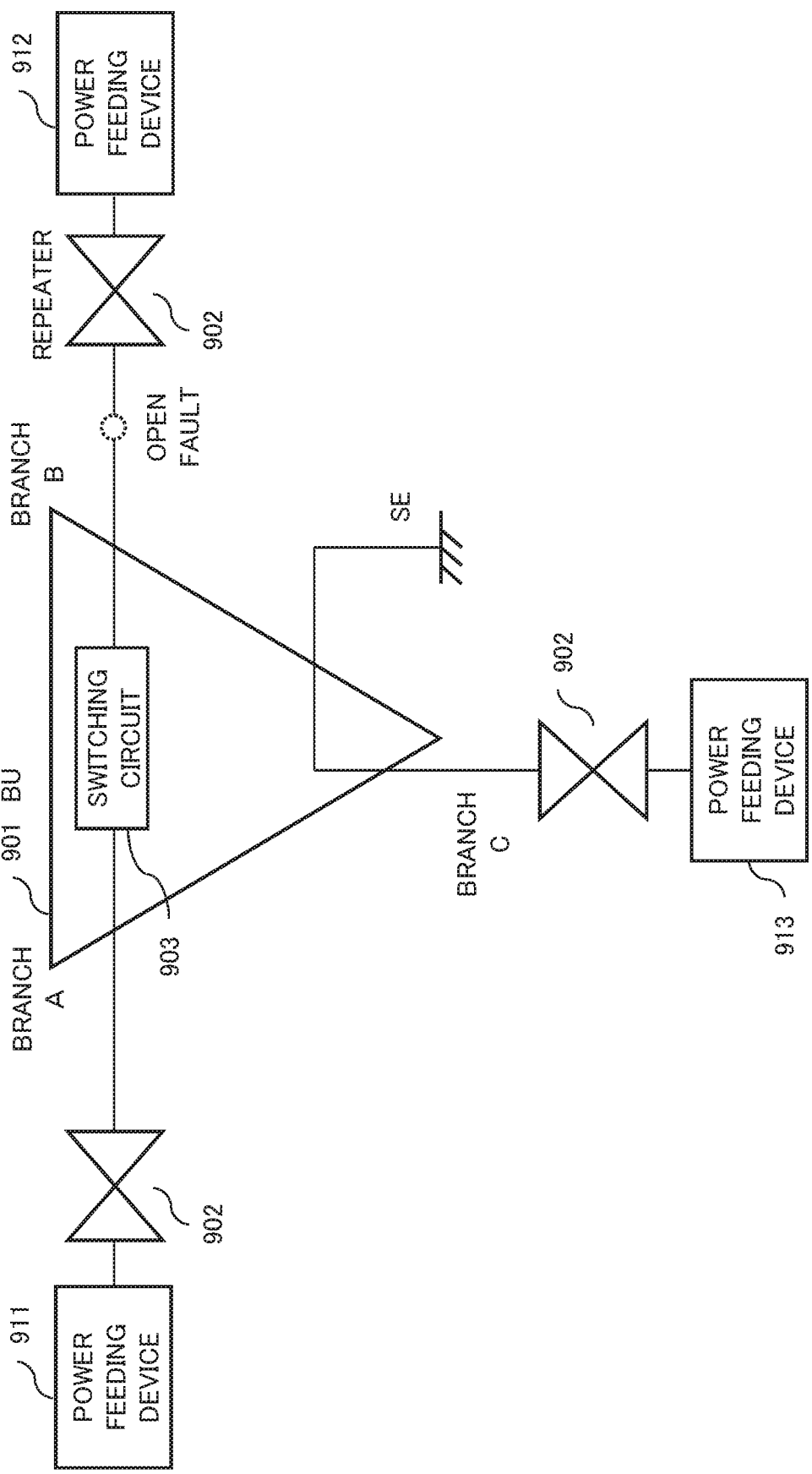
FIG. 21 is a second diagram illustrating an example of a fault that electric power is not supplied to the switching circuit 903.

FIG. 15 is a block diagram illustrating an example of a configuration of a submarine branching unit 800 according to a second example embodiment of the present invention. The submarine branching unit 800 includes a switching circuit 801, a control circuit 802, and a connection circuit 803. The switching circuit 801 serves as a switching means for switching a plurality of power feeding paths formed between first to third power receiving ports 811 to 813. The control circuit 802 serves as a control means for receiving power feeding from a power feeding path formed between the first power receiving port 811 and the second power receiving port 812, and controlling the switching circuit 801. The connection circuit 803 serves as a connection means for connecting the control circuit 802 between the third power receiving port 813 and a sea earth when power is not fed to the control circuit 802 from the power feeding path formed between the first power receiving port 811 and the second power receiving port 812.

The submarine branching unit 800 having such a configuration connects the control circuit 802 to the power feeding path formed between the third power receiving port 813 and the sea earth even when power feeding to the control circuit 802 from the power feeding path formed between the first power receiving port 811 and the second power receiving port 812 is lost. Thus, power feeding to the control circuit 802 can be maintained.

Therefore, the submarine branching unit 800 according to the second example embodiment can achieve switching control of a power feeding path even when a ground fault and an open fault occur on the power feeding path.

The switching circuit 801 according to the present example embodiment is associated with the RL(1) 311 to the RL(4) 314 according to the first example embodiment. The control circuit 802 is associated with the RL control circuit 301 according to the first example embodiment. The connection circuit 803 is associated with the connection circuit 123 of the BU 101 according to the first example embodiment.

Note that the example embodiments of the present invention may also be described as supplementary notes below, which is not limited thereto.

[Supplementary Note 1]

A submarine branching unit, comprising:

switching means for switching a plurality of power feeding paths formed between first to third power receiving ports;

control means for receiving power feeding from a power feeding path formed between the first power receiving port and the second power receiving port, and controlling the switching means; and connection means for connecting the control means between the third power receiving port and a sea earth when power is not fed to the control means from a power feeding path formed between the first power receiving port and the second power receiving port.

[Supplementary Note 2]

The submarine branching unit according to supplementary note 1, wherein the third power receiving port is connected to a terminal station different from a terminal station connected to a power feeding path formed between the first power receiving port and the second power receiving port.

[Supplementary Note 3]

The submarine branching unit according to supplementary note 2, further comprising detection means for detecting a power feeding state to the power feeding path formed between the first power receiving port and the second power receiving port, wherein the connection means connects the control means between the third power receiving port and the sea earth, based on an output of the detection means.

[Supplementary Note 4]

The submarine branching unit according to any one of supplementary note 2 or 3, wherein the connection means connects the control means between the third power receiving port and the sea earth, based on a control signal received from any of the terminal stations.

[Supplementary Note 5]

The submarine branching unit according to any one of supplementary notes 1 to 4, wherein, after the connection means connects the control means between the third power receiving port and the sea earth, the control means controls the switching means in such a way as to switch to a path that does not pass through the connection means, between the third power receiving port and the sea earth.

[Supplementary Note 6]

The submarine branching unit according to any one of supplementary notes 1 to 5, further comprising a function of branching and outputting an input optical signal.

[Supplementary Note 7]

A communication system, comprising:

a terminal station including a power feeding device; and the submarine branching unit according to supplementary note 6, wherein the terminal station is capable of feeding power to the submarine branching unit.

[Supplementary Note 8]

A submarine branching method of switching a plurality of power feeding paths formed between first to third power receiving ports, the submarine branching method comprising:

causing control means to receive power feeding from a power feeding path formed between the first power receiving port and the second power receiving port, and controlling switching of the plurality of power feeding paths; and causing the control means to receive power feeding from a power feeding path formed between the third power receiving port and a sea earth when power is not fed to the control means from a power feeding path formed between the first power receiving port and the second power receiving port, and controlling switching of the plurality of power feeding paths.

[Supplementary Note 9]

The submarine branching method according to supplementary note 8, further comprising connecting the third power receiving port to a terminal station different from a terminal station connected to the power feeding path formed between the first power receiving port and the second power receiving port.

[Supplementary Note 10]

The submarine branching method according to supplementary note 9, further comprising connecting the control means between the third power receiving port and the sea earth by connection means, based on a power feeding state to a power feeding path formed between the first power receiving port and the second power receiving port.

[Supplementary Note 11]

The submarine branching method according to supplementary note 10, further comprising connecting the control means between the third power receiving port and the sea earth by the connection means, based on a control signal received from any of the terminal stations.

[Supplementary Note 12]

The submarine branching method according to supplementary note 10 or 11, further comprising, after the connecting the control means between the third power receiving port and the sea earth, switching to a path that does not pass through the connection means, between the third power receiving port and the sea earth.

Although the present invention has been described above with reference to the example embodiments, the present invention is not limited to the above-described example embodiments. Various modifications that can be understood by those skilled in the art can be made to the configuration and the details of the present invention within the scope of the present invention.

Further, the configuration described in each of the example embodiments is not necessarily exclusive each other. The action and effects of the present invention may be achieved by a configuration combining the whole or a part of the above-mentioned example embodiments.

A part or the whole of the function and the procedure described in each of the example embodiments above may be achieved by a program executed by a central processing unit (CPU) included in the power feeding circuit 120 or the submarine branching unit 800. The program is recorded in a non-temporary fixed recording medium. A semiconductor memory or a fixed magnetic disk device is used as the recording medium, which is not limited thereto. The CPU is a computer included in a branching unit or a submarine branching unit, for example.

This application is based upon and claims the benefit of priority from Japanese patent application No. 2017-189336, filed on Sep. 29, 2017, the disclosure of which is incorporated herein in its entirety by reference.

REFERENCE SIGNS LIST

100 Submarine cable system
101 Submarine branching unit (BU)
102 Repeater
103 to 105 Power feeding device
120 Power feeding circuit
121 Switching circuit
122 Control circuit
123 Connection circuit
301 to 302 RL control circuit
311 RL(1)
312 RL(2)
313 RL(3)
314 RL(4)
315 to 316 RLE
401 RLA drive circuit
402 RLB drive circuit
403 RLC drive circuit
404 RLD drive circuit
411, 421 RLA
412, 422 RLB
413, 423 RLC
414, 424 RLD
511 to 512 Rectifier circuit
601 First power receiving port
602 Second power receiving port
603 Third power receiving port
701 Land station
702 to 703 Optical coupler
704 to 705 O/E conversion circuit
711 Optical transmission path
800 Submarine branching unit
801 Switching circuit
802 Control circuit
803 Connection circuit
811 First power receiving port
812 Second power receiving port
813 Third power receiving port
900 Submarine cable system
901 Branching unit (BU)
902 Repeater
903 Switching circuit
911 to 913 Power feeding device

The invention claimed is:

1. A submarine branching unit, comprising:
a switching circuit configured to switch a plurality of power feeding paths formed between first to third power receiving ports;
a control circuit configured to receive power feeding from a power feeding path formed between the first power receiving port and the second power receiving port, and control the switching circuit; and
a connection circuit configured to connect the control circuit between the third power receiving port and a sea earth when power is not fed to the control circuit from a power feeding path formed between the first power receiving port and the second power receiving port,
wherein after the connection circuit connects the control circuit between the third power receiving port and the sea earth, the control circuit controls the switching circuit to switch to a path that does not pass through the connection circuit, between the third power receiving port and the sea earth.

2. The submarine branching unit according to claim 1, wherein
the third power receiving port is connected to a terminal station different from a terminal station connected to a power feeding path formed between the first power receiving port and the second power receiving port.

3. The submarine branching unit according to claim 2, further comprising
a detection circuit configured to detect a power feeding state to the power feeding path formed between the first power receiving port and the second power receiving port, wherein
the connection circuit connects the control circuit between the third power receiving port and the sea earth, based on an output of the detection circuit.

4. The submarine branching unit according to claim 2, wherein
the connection circuit connects the control circuit between the third power receiving port and the sea earth, based on a control signal received from any of the terminal stations.

5. The submarine branching unit according to claim 1, further comprising
a function of branching and outputting an input optical signal.

6. A communication system, comprising:
a terminal station including a power feeding device; and
the submarine branching unit according to claim 5, wherein
the terminal station is capable of feeding power to the submarine branching unit.

7. A submarine branching method of switching a plurality of power feeding paths formed between first to third power receiving ports, the submarine branching method comprising:
causing a control circuit to receive power feeding from a power feeding path formed between the first power receiving port and the second power receiving port, and controlling switching of the plurality of power feeding paths;
causing the control circuit to receive power feeding from a power feeding path formed between the third power receiving port and a sea earth when power is not fed to the control circuit from a power feeding path formed between the first power receiving port and the second power receiving port, and controlling switching of the plurality of power feeding paths;
connecting the third power receiving port to a terminal station different from a terminal station connected to the power feeding path formed between the first power receiving port and the second power receiving port; and
connecting the third power receiving port to a terminal station different from a terminal station connected to the power feeding path formed between the first power receiving port and the second power receiving port,
wherein after the connecting the control circuit between the third power receiving port and the sea earth, switching to a path that does not pass through the connection circuit, between the third power receiving port and the sea earth.

8. The submarine branching method according to claim 7, further comprising
connecting the control circuit between the third power receiving port and the sea earth by the connection circuit, based on a control signal received from any of the terminal stations.

9. The submarine branching unit according to claim 3, wherein
the connection circuit connects the control circuit between the third power receiving port and the sea earth, based on a control signal received from any of the terminal stations.

10. The submarine branching unit according to claim 2, wherein,
after the connection circuit connects the control circuit between the third power receiving port and the sea earth, the control circuit controls the switching circuit in such a way as to switch to a path that does not pass through the connection circuit, between the third power receiving port and the sea earth.

11. The submarine branching unit according to claim 3, wherein,
after the connection circuit connects the control circuit between the third power receiving port and the sea earth, the control circuit controls the switching circuit in such a way as to switch to a path that does not pass through the connection circuit, between the third power receiving port and the sea earth.

12. The submarine branching unit according to claim 4, wherein,
after the connection circuit connects the control circuit between the third power receiving port and the sea earth, the control circuit controls the switching circuit in such a way as to switch to a path that does not pass through the connection circuit, between the third power receiving port and the sea earth.

13. The submarine branching unit according to claim 2, further comprising a function of branching and outputting an input optical signal.

14. The submarine branching unit according to claim 3, further comprising a function of branching and outputting an input optical signal.

15. The submarine branching unit according to claim 4, further comprising a function of branching and outputting an input optical signal.

* * * * *